(12) United States Patent
Oterhals et al.

(10) Patent No.: US 9,406,155 B2
(45) Date of Patent: Aug. 2, 2016

(54) GRAPHICS PROCESSING SYSTEMS

(75) Inventors: Jon Erik Oterhals, Trondheim (NO); Daren Croxford, Cambridge (GB); Lars Ericsson, Cambridge (GB); Jørn Nystad, Trondheim (NO); Eivind Liland, Berlin (DE)

(73) Assignee: ARM Limited, Cambridge (GB)

(*) Notice: Subject to any disclaimer, the term of this patent is extended or adjusted under 35 U.S.C. 154(b) by 1332 days.

(21) Appl. No.: 12/923,518

(22) Filed: Sep. 24, 2010

(65) Prior Publication Data

US 2011/0102446 A1    May 5, 2011

Related U.S. Application Data

(63) Continuation-in-part of application No. 12/588,459, filed on Oct. 15, 2009.

(30) Foreign Application Priority Data

Sep. 25, 2009   (GB) .................................. 0916924.4
Sep. 2, 2010    (GB) .................................. 1014602.5

(51) Int. Cl.
 *G09G 5/36*   (2006.01)
 *G06T 1/60*   (2006.01)
 (Continued)

(52) U.S. Cl.
 CPC .............. *G06T 11/40* (2013.01); *G09G 5/363* (2013.01); *G09G 5/393* (2013.01); *G09G 5/395* (2013.01); *G09G 2310/04* (2013.01); *G09G 2320/103* (2013.01)

(58) Field of Classification Search
 USPC .................................................. 345/530, 545
 See application file for complete search history.

(56) References Cited

U.S. PATENT DOCUMENTS 5,181,131 A    1/1993  Yamazaki et al.
5,241,656 A    8/1993  Loucks et al.
(Continued)

FOREIGN PATENT DOCUMENTS

CN    1834890      9/2006
CN    101116341    1/2008
(Continued)

OTHER PUBLICATIONS

UK Combined Search and Examination Report dated Jan. 26, 2011 in GB 1016162.8.
(Continued)

*Primary Examiner* — Jacinta M Crawford
(74) *Attorney, Agent, or Firm* — Nixon & Vanderhye P.C.

(57) ABSTRACT

A graphics processor 1 includes after its tile rendering logic 40, a transaction elimination unit 5 that includes data block generation logic 41 and block comparison logic 43. The block generation logic 41 generates data blocks from the rendered tiles produced by the tile rendering logic 40. The data blocks are then stored in buffers 42. Comparison logic 43 then compares a new data block with the previous data block (which will already be stored in the buffers 42), and generates an output metadata bit indicating whether the blocks can be considered to be the same or not, on the basis of the comparison. The meta-data output bits are stored appropriately in a meta-data bitmap 45 in main memory 2 that is associated with the output data array in question. If the blocks are determined to be different by the comparison logic then the new data block is written from the buffers 42 to the frame buffer 44 in the main memory 2. On the other hand, if the two blocks are considered to be similar to each other, the new block is not written into the data array in the frame buffer 44.

25 Claims, 7 Drawing Sheets

(51) Int. Cl.
*G06T 11/40* (2006.01)
*G09G 5/393* (2006.01)
*G09G 5/395* (2006.01)

(56) References Cited

U.S. PATENT DOCUMENTS

| | | | |
|---|---|---|---|
| 5,686,934 | A | 11/1997 | Nonoshita et al. |
| 6,069,611 | A | 5/2000 | Flynn et al. |
| 6,075,523 | A | 6/2000 | Simmers |
| 6,094,203 | A | 7/2000 | Desormeaux |
| 6,101,222 | A | 8/2000 | Dorricott |
| 6,304,606 | B1 | 10/2001 | Murashita et al. |
| 6,825,847 | B1 | 11/2004 | Molnar et al. |
| 7,190,284 | B1 | 3/2007 | Dye et al. |
| 7,671,873 | B1 | 3/2010 | Pierini et al. |
| 8,254,685 | B2 | 8/2012 | Greene et al. |
| 8,749,711 | B2 | 6/2014 | Um |
| 2002/0036616 | A1 | 3/2002 | Inoue |
| 2003/0080971 | A1 | 5/2003 | Hochmuth et al. |
| 2004/0141613 | A1 | 7/2004 | Hayashi |
| 2005/0168471 | A1 | 8/2005 | Paquette |
| 2005/0285867 | A1 | 12/2005 | Brunner et al. |
| 2006/0050976 | A1 | 3/2006 | Molloy |
| 2006/0152515 | A1 | 7/2006 | Lee et al. |
| 2006/0188236 | A1 | 8/2006 | Kitagawa |
| 2006/0203283 | A1 | 9/2006 | Fujimoto |
| 2007/0005890 | A1 | 1/2007 | Gabel et al. |
| 2007/0083815 | A1* | 4/2007 | Delorme .............. G11B 27/105 715/723 |
| 2007/0146380 | A1 | 6/2007 | Nystad et al. |
| 2007/0188506 | A1 | 8/2007 | Hollevoet et al. |
| 2007/0257925 | A1 | 11/2007 | Brunner et al. |
| 2007/0261096 | A1 | 11/2007 | Lin et al. |
| 2007/0273787 | A1 | 11/2007 | Ogino et al. |
| 2008/0002894 | A1* | 1/2008 | Hayon .................. G06F 3/1462 382/232 |
| 2008/0059581 | A1 | 3/2008 | Pepperell |
| 2008/0143695 | A1 | 6/2008 | Juenemann et al. |
| 2009/0033670 | A1 | 2/2009 | Hochmuth et al. |
| 2009/0202176 | A1* | 8/2009 | Hwang et al. ................. 382/294 |
| 2010/0058229 | A1 | 3/2010 | Mercer |
| 2010/0332981 | A1 | 12/2010 | Lipton et al. |
| 2011/0074765 | A1 | 3/2011 | Oterhals et al. |
| 2011/0074800 | A1 | 3/2011 | Stevens et al. |
| 2011/0102446 | A1 | 5/2011 | Oterhals et al. |
| 2012/0092451 | A1 | 4/2012 | Nystad et al. |
| 2012/0176386 | A1 | 7/2012 | Hutchins |
| 2012/0206461 | A1 | 8/2012 | Wyatt et al. |
| 2012/0268480 | A1 | 10/2012 | Cooksey et al. |
| 2012/0293545 | A1 | 11/2012 | Engh-Halstvedt et al. |
| 2013/0067344 | A1 | 3/2013 | Ungureanu et al. |

FOREIGN PATENT DOCUMENTS

| | | |
|---|---|---|
| EP | 1 035 536 A2 | 9/2000 |
| EP | 1 484 737 A1 | 12/2004 |
| JP | 63-298485 | 12/1988 |
| JP | 05266177 A | 3/1992 |
| JP | 5-227476 | 9/1993 |
| JP | 5-266177 | 10/1993 |
| JP | 11-328441 | 11/1999 |
| JP | 11-355536 | 12/1999 |
| JP | 2004-510270 | 4/2004 |
| JP | 2005-195899 | 7/2005 |
| JP | 2006-268839 | 10/2006 |
| JP | 2007-81760 | 3/2007 |
| JP | 2007-531355 | 11/2007 |
| WO | WO 02/27661 A2 | 4/2002 |
| WO | WO 2005/055582 A2 | 6/2005 |
| WO | WO 2008/026070 | 3/2008 |

OTHER PUBLICATIONS

Office Action mailed Feb. 21, 2012 in co-pending U.S. Appl. No. 12/588,459.
Office Action mailed Feb. 17, 2012 in co-pending U.S. Appl. No. 12/588,461.
U.S. Appl. No. 12/923,517, filed Sep. 24, 2010; Croxford et al.
U.S. Appl. No. 12/588,461, filed Oct. 15, 2009; Stevens et al.
U.S. Appl. No. 12/588,459, filed Oct. 15, 2009; Oterhals et al.
U.S. Appl. No. 13/898,510, filed May 21, 2013; Croxford et al.
M.J. Weinberger et al, "The LOCO-I Lossless Image Compression Algorithm: Principles and Standardization into JPEG-LS" 34 pages, 2004.
M. Ferretti et al, "A Parallel Pipelined Implementation of LOCO-I for JPEG-LS" IEEE 2004, 4 pages.
Intel Buffer Compression (http://virtuousgeek.org/blog) Jan. 2011, 5 pages.
Z. Ma et al, "Frame Buffer Compression for Low-Power Video Coding" 18th IEEE International Conference on Image Processing, 2011, pp. 757-760.
T.L.B. Yng et al, "Low Complexity, Lossless Frame Memory Compression Using Modified Hadamard Transform and Adaptive Golomb-Rice Coding" IADIS International Conference Computer Graphics and Visualization, 2008, pp. 89-96.
A.J. Penrose, "Extending Lossless Image Compression" University of Cambridge Computer laboratory Technical Report No. 526, Dec. 2001, 149 pages.
R.A. Patel et al, "Parallel Lossless Data Compression on the GPU" IEEE 2012, 10 pages.
Arctablet (http://www.arctablet.com/blog . . . ) 2010, 12 pages.
Office Action mailed Jun. 5, 2013 in co-pending U.S. Appl. No. 12/588,461.
Official Action mailed Aug. 29, 2012 in U.S. Appl. No. 12/588,459.
Official Action mailed Aug. 30, 2012 in U.S. Appl. No. 12/588,461.
Combined Search and Examination Report, Jan. 26, 2011, in corresponding European Application No. GB1016165.1.
United Kingdom Search Report in United Kingdom Application No. GB0916924.4, Jan. 15, 2010.
Shim et al., *A Compressed Frame Buffer to Reduce Display Power Consumption in Mobile Systems*, IEEE, Asia and South Pacific Design Automation Conference (ASP-DAC'04) pp. 1-6, 2006.
Shim, *Low-Power LCE Display Systems*, School of Computer Science and Engineering, Seoul National University, Korea, 2006.
Chamoli, Deduplication—A Quick Tutorial, Aug. 8, 2008, http://thetoptenme.wordpress.com/2008/08/08/duplication-a-quick-tutorial/ pp. 1-5.
Hollevoet et al., *A Power Optimized Display Memory Organization for Handheld User Terminals*, IEEE 2004, pp. 1-6.
Akeley et al., Real-Time Graphics Architecture, http://graphics.stanford.edu/courses/cs448a-01-fall, 2001, pp. 1-19.
Office Action mailed Jan. 22, 2013 in co-pending U.S. Appl. No. 12/588,459.
Final Office Action mailed Dec. 3, 2013 in co-pending U.S. Appl. No. 12/588,461.
Office Action mailed Nov. 21, 2013 in co-pending U.S. Appl. No. 12/923,517.
U.S. Appl. No. 13/435,733, filed Mar. 30, 2012, Cooksey et al.
Final Rejection mailed Jul. 2, 2013 in co-pending U.S. Appl. No. 12/588,459.
Combined Search and Examination Report, Jul. 27, 2012 in GB 1205846.7.
M. Weinberger et al., The LOCO-I Lossless Image Compression Algorithm: Principles and Standardization into JPEG-LS, pp. 1-34; Published in: Image Processing, IEEE Transactions on . . . (vol. 8, Issue 8), Aug. 2000.
Office Action mailed Dec. 20, 2013 in co-pending U.S. Appl. No. 13/435,733.
Japanese Office Action issued in Japanese Patent Application No. 2010-213509 dated Jun. 23, 2014 (w/ translation)-7 pp.
U.S. Office Action issued in U.S. Appl. No. 13/435,733 dated Jun. 17, 2014.
Chinese First Office Action dated Jul. 31, 2014 in CN 201010294382.5 and English translation, 54 pages.
Bergsagel, Jonathan, et al., "Super high resolution displays empowered by the OMAP4470 mobile processor: WUXGA resolution tablets now becoming a reality for the Android ecosystem", Texas Instruments, Dallas, Texas, 2012, pp. 1-16.

(56) References Cited

OTHER PUBLICATIONS

Khan, Moinul H., et al., "Bandwidth-efficient Display Controller for Low Power Devices in Presence of Occlusion", Consumer Electronics, ICCE 2007, Digest of Technical Papers, International Conference on Jan. 10-14, 2007 (2 pages).
Park, Woo-Chan, et al., "Order Independent Transparency for Image Composition Parallel Rendering Machines", P.-C. Yew and J. Xue (Eds.): A CSA 2004, LNCS 3189, pp. 449-460.
"Quick look at the Texas Instruments TI OMAP 4470 CPU, Kindle Fire HD CPU", Arctablet News, 2014 Arctablet Blog, pp. 1-7.
U.S. Appl. No. 14/032,481, filed Sep. 20, 2013; Inventor; Croxford et al.
XDamage Extension, http://www.freedesktop.org/wiki/Software/XDamage/?action=print, last edited May 18, 2013, 2 pages.
Creating a polygon shape from a 2d tile array, mhtml://X:\Documents and Settings\jtothill.DEHNS.002\Local Settings\Temporar . . . , last edited Oct. 5, 2009, 3 pages.
Android-eepc / base, https://gitorious,org/android-eepc/base/source/ . . . , 2007©, 9 pages.
"Qt source code", 2013©, 264 pages https://qt.gitorious.org/qt/qt/source/427e398a7b7f3345fb4dcbc275b3ea29f211851b:src/gui/kernel/gwidget.cpp.
EGL (OpenGL), http://en.wikipedia.org/wiki/EGL_(OpenGL), last edited Sep. 21, 2012.
Office Action mailed Feb. 21, 2012 in U.S. Appl. No. 12/588,459, pp. 1-29.
Office Action mailed Feb. 21, 2012 in U.S. Appl. No. 12/588,461, pp. 1-29.
Office Action mailed Jun. 20, 2013 in U.S. Appl. No. 12/588,459, pp. 1-26.
Office Action mailed Jul. 2, 2013 in U.S. Appl. No. 12/588,459, pp. 1-24.
Office Action mailed Feb. 17, 2012 in U.S. Appl. No. 12/588,461, pp. 1-20.
Office Action mailed Dec. 3, 2013 in U.S. Appl. No. 12/588,461, pp. 1-18.
Office Action mailed Nov. 21, 2013 in U.S. Appl. No. 12/923,517, pp. 1-21.
Shim et al., A Backlight Power Management Framework for Battery-Operated Multimedia Systems, Submitted to IEEE Design and Test of Computers, Special Issue on Embedded Systems for Real-Time Multimedia, vol. 21, Issue 5, pp. 388-396, May-Jun. 2004.
UK Combined Search and Examination Report dated Jan. 26, 2011 in GB 1016165.1.
Gatti et al., Lower Power Control Techniques for TFT LCD Displays, Oct. 8-11, 2002, Grenoble, France, pp. 218-224.
Choi et al., Low-Power Color TFT LCD Display for Hand-Held Embedded Systems, Aug. 12-14, 2002, Monterey, California, pp. 112-117.
Iyer et al., Energy-Adaptive Display System Designs for Future Mobile Environments, HP Laboratories Palto Alto, Apr. 23, 2003.
Carts-Powell, Cholesteric LCDs Show Images After Power is Turned Off; OptoIQ, Sep. 1, 1998.
Patel et al., Frame Buffer Energy Optimization by Pixel Prediction, Proceedings of the 2005 International Conference on Computer Design, Jun. 2005.
Smalley, ATI's Radeon X800 Series Can Do Transparency AA Too, Sep. 29, 2005.
Esselbach, Adaptive Anti-Aliasing on ATI Radeon X800 Boards Investigated, Oct. 17, 2005.
Digital Visual Interface DVI, Revision 1.0, Digital Display Working Group, Apr. 2, 1999, pp. 1-76.
Ma, OLED Solution for Mobile Phone Subdisplay, Apr. 2003.
Quick Look at the Texas Instruments TI OMAP 4470 CPU, Kindle Fire HD CPU, http://www.arctablet.com/blog/featured/quick-look-texas-instruments-ti-omap-4470-cpu; posted Sep. 6, 2012 in Archos Gen10 CPU TI OMAP TI OMAP 4470; 12 pages; Sep. 6, 2012.
Office Action mailed Dec. 20, 2013 in U.S. Appl. No. 13/435,733, pp. 1-29.
U.S. Office Action issued in U.S. Appl. No. 12/588,461 dated Jul. 22, 2014.
U.S. Appl. No. 14/255,395, filed Apr. 17, 2014, Croxford et al.
Chinese First Office Action dated Jun. 11, 2014 in CN 201010294392.9 and English translation, 17 pages.
English Translation of Japanese Official Action mailed Apr. 7, 2014 in Japanese Application No. 2010-213508.
Japanese Office Action mailed Apr. 7, 2014 in Japanese Application No. 2010-213508.
Japanese Office Action issued in Japanese Patent Application No. 2010-213509 dated Jun. 23, 2014 (w/translation)-7 pp.
Final Rejection mailed Feb. 24, 2015 in co-pending U.S. Appl. No. 12/588,461.
Vesa Digital Packet Video Link Standard, Video Electronics Standards Association, Version 1, Apr. 18, 2004, 86 pages.
Office Action mailed Mar. 24, 2015 in U.S. Appl. No. 13/898,510, 35 pages.
Office Action mailed Apr. 2, 2015 in U.S. Appl. No. 13/435,733, 39 pages.
Notice of Allowance mailed Jul. 7, 2015 in co-pending U.S. Appl. No. 14/032,481 24 pages.
Final Office Action mailed Jan. 4, 2016 in co-pending U.S. Appl. No. 13/435,733 37 pages.
Heade, T., et al., "HDR Image Composition and Tone Mapping on the Cell Processor", MSc Interactive Entertainment Technology, Trinity College Dublin, Graphic Vision and Visualisation GV2 group, Dec. 11, 2009, pp. 59-66.
"Composition Processing Cores (CPC)" http://www.vivantecorp.com/index.php/en/technology/compositon.html, retrieved Aug. 20, 2014.
Zhong et al, "Energy Efficiency of Handheld Computer Interfaces: Limits, Characterization and Practice" MobiSys '05: The Third International Conference on Mobile Systems, Applications, and Services, Jun. 6, 2005, pp. 247-260.
Final Office mailed Jul. 29, 2015 in co-pending U.S. Appl. No. 13/898,510 28 pages.

\* cited by examiner

GRAPHICS PROCESSING SYSTEMS

This application is a continuation-in-part (CIP) application of commonly-assigned U.S. Ser. No. 12/588,459, filed on Oct. 15, 2009, and claims priority to UK Patent Application No. 0916924.4, filed on Sep. 25, 2009, and UK Patent Application No. 1014602.5, filed on Sep. 2, 2010, the disclosures of each of which are incorporated herein by reference.

The technology described in this application relates to graphics processing systems and in particular to frame buffer generation and similar operations in graphics processing systems.

As is known in the art, the output of a graphics processing system to be displayed is usually written to a so-called "frame buffer" in memory when it is ready for display. The frame buffer is then read by a display controller and output to the display (which may, e.g., be a screen or a printer) for display.

The writing of the graphics data to the frame buffer consumes a relatively significant amount of power and memory bandwidth, particularly where, as is typically the case, the frame buffer resides in memory that is external to the graphics processor. For example, a new frame may need to be written to the frame buffer at rates of 30 frames per second or higher, and each frame can require a significant amount of data, particularly for higher resolution displays and high definition (HD) graphics.

It is known therefore to be desirable to try to reduce the power consumption of frame buffer operations and various techniques have been proposed to try to achieve this.

These techniques include providing an on-chip (as opposed to external) frame buffer, frame buffer caching (buffering), frame buffer compression and dynamic colour depth control. However, each of these techniques has its own drawbacks and disadvantages.

For example, using an on-chip frame buffer, particularly for higher resolution displays, may require a large amount of on-chip resources. Frame buffer caching or buffering may not be practicable as frame generation is typically asynchronous to frame buffer display. Frame buffer compression can help, but the necessary logic is relatively complex, and the frame buffer format is altered. Lossy frame buffer compression will reduce image quality. Dynamic colour depth control is similarly a lossy scheme and therefore reduces image quality.

The Applicants believe therefore that there remains scope for improvements to frame buffer generation and similar operations in graphics processing systems.

According to a first aspect of the technology described in this application, there is provided a method of operating a graphics processing system in which data generated by the graphics processing system is used to form an output array of data in an output buffer, the method comprising:

the graphics processing system storing the output array of data in the output buffer by writing blocks of data representing particular regions of the output array of data to the output buffer; and the graphics processing system, when a block of data is to be written to the output buffer, comparing that block of data to at least one block of data already stored in the output buffer, and determining whether or not to write the block of data to the output buffer on the basis of the comparison.

According to a second aspect of the technology described in this application, there is provided a graphics processing system, comprising:

a graphics processor comprising means for generating data to form an output array of data to be provided by the graphics processor;

means for storing data generated by the graphics processor as an array of data in an output buffer by writing blocks of data representing particular regions of the array of data to the output buffer; and wherein:

the graphics processing system further comprises:

means for comparing a block of data that is ready to be written to the output buffer to at least one block of data already stored in the output buffer and for determining whether or not to write the block of data to the output buffer on the basis of that comparison.

According to a third aspect of the technology described in this application, there is provided a graphics processor comprising:

means for writing a block of data generated by the graphics processor and representing a particular region of an output array of data to be provided by the graphics processor to an output buffer; and means for comparing a block of data that is ready to be written to the output buffer to at least one block of data already stored in the output buffer and for determining whether or not to write the block of data to the output buffer on the basis of that comparison.

The technology described in this application relates to and is implemented in a graphics processing system in which an output array of data (which could be, e.g., and in one preferred embodiment is, a frame to be displayed) is stored in an output buffer (which could, e.g., be, and in one preferred embodiment is, the frame buffer) by writing blocks of data (which could, e.g., be, and in one preferred embodiment are, rendered tiles generated by the graphics processor) that represent particular regions of the output array of data to the output buffer.

In essence therefore, the technology described in this application relates to and is intended to be implemented in graphic processing systems in which the overall, "final" output of the graphics processing system is stored in memory on a block-by-block basis, rather than directly as a single, overall, output "frame".

This will be the case, for example, and as will be appreciated by those skilled in the art, in a tile-based graphics processing system, in which case each block of data that is considered and compared in the manner of the technology described in this application may (and in one preferred embodiment does) correspond to a "tile" that the rendering process of the graphics processor produces (although as will be discussed further below, this is not essential).

(As is known in the art, in tile-based rendering, the two dimensional output array or frame of the rendering process (the "render target") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete output array (frame) (render target), e.g. for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

In the technology described in this application, rather than each output data block (e.g. rendered tile) simply being written out to the frame buffer once it is ready, the output data block is instead first compared to a data block or blocks (e.g. tile or tiles) (to at least one data block) that is already stored in the output (e.g. frame) buffer, and it is then determined whether to write the (new) data block to the output buffer (or not) on the basis of that comparison.

As will be discussed further below, the Applicants have found and recognised that this process can be used to reduce significantly the number of data blocks (e.g. rendered tiles) that will be written to the output (e.g. frame) buffer in use, thereby significantly reducing the number of output (e.g. frame) buffer transactions and hence the power and memory bandwidth consumption related to output (e.g. frame) buffer operation.

For example, if it is found that a newly generated data block is the same as a data block (e.g. rendered tile) that is already present in the output buffer, it can be (and preferably is) determined to be unnecessary to write the newly generated data block to the output buffer, thereby eliminating the need for that output buffer "transaction".

Moreover, the Applicants have recognised that it may be a relatively common occurrence for a new data block (e.g. rendered tile) to be the same or similar to a data block (e.g. rendered tile) that is already in the output (e.g. frame) buffer, for example in regions of an image that do not change from frame to frame (such as the sky, the playfield when the camera position is static, much of the user interface for many applications, etc.). Thus, by facilitating the ability to identify such regions (e.g. tiles) and to then, if desired, avoid writing such regions (e.g. tiles) to the output (e.g. frame) buffer again, a significant saving in write traffic (write transactions) to the output (e.g. frame) buffer can be achieved.

For example, the Applicants have found that for some common games, up to 20% (or even more) of the rendered tiles in each frame may be unchanged. If 20% of the tiles in a frame are not rewritten to the frame buffer (by using the technology described in this application) then for HD 1080p graphics at 30 frames per second (fps) the estimated power and memory bandwidth savings may be about 30 mW and 50 MB/s. In cases where even more rendered tiles do not change from frame to frame, even greater power and bandwidth savings can be achieved. For example, if 90% of the rendered tiles are not rewritten (are unchanged) then the savings may be of the order of 135 mW and 220 MB/s.

Thus the technology described in this application can be used to significantly reduce the power consumed and memory bandwidth used for frame and other output buffer operation, in effect by facilitating the identification and elimination of unnecessary output (e.g. frame) buffer transactions.

Furthermore, compared to the prior art schemes discussed above, the technology described in this application requires relatively little on-chip hardware, can be a lossless process, and doesn't change the frame buffer format. It can also readily be used in conjunction with, and is complementary to, existing frame buffer power reduction schemes, thereby facilitating further power savings if desired.

The output array of data that the data generated by the graphics processing system is being used to form may be any suitable and desired such array of data, i.e. that a graphics processor may be used to generate. In one particularly preferred embodiment it comprises an output frame for display, but it may also or instead comprise other outputs of a graphics processor such as a graphics texture (where, e.g., the render "target" is a texture that the graphics processor is being used to generate (e.g. in "render to texture" operation) or other surface to which the output of the graphics processor system is to be written.

Similarly, the output buffer that the data is to be written to may comprise any suitable such buffer and may be configured in any suitable and desired manner in memory. For example, it may be an on-chip buffer or it may be an external buffer (and, indeed, may be more likely to be an external buffer (memory), as will be discussed below). Similarly, it may be dedicated memory for this purpose or it may be part of a memory that is used for other data as well. In one preferred embodiment the output buffer is a frame buffer for the graphics processing system and/or for the display that the graphics processing system's output is to be provided to.

The blocks of data that are considered and compared in the technology described in this application can each represent any suitable and desired region (area) of the overall output array of data that is to be stored in the output buffer. So long as the overall output array of data is divided or partitioned into a plurality of identifiable smaller regions each representing a part of the overall output array, and that can accordingly be represented as blocks of data that can be identified and compared in the manner of the technology described in this application, then the sub-division of the output array into blocks of data can be done as desired.

Each block of data preferably represents a different part (sub-region) of the overall output array (although the blocks could overlap if desired). Each block should represent an appropriate portion (area) of the output array, such as a plurality of data positions within the array. Suitable data block sizes would be, e.g., 8×8, 16×16 or 32×32 data positions in the output data array.

In one particularly preferred embodiment, the output array of data is divided into regularly sized and shaped regions (blocks of data), preferably in the form of squares or rectangles. However, this is not essential and other arrangements could be used if desired.

In one particularly preferred embodiment, each data block corresponds to a rendered tile that the graphics processor produces as its rendering output. This is a particularly straightforward way of implementing the technology described in this application, as the graphics processor will generate the rendering tiles directly, and so there will be no need for any further processing to "produce" the data blocks that will be considered and compared in the manner of the technology described in this application. In this case therefore, as each rendered tile generated by the graphics processor is to be written to the output (e.g. frame) buffer, it will be compared with a rendered tile or tiles already stored in the output buffer and the newly rendered tile then written or not to the output buffer on the basis of that comparison.

Thus, according to a fourth aspect of the technology described in this application, there is provided a method of operating a tile-based graphics processing system in which rendered tiles generated by the graphics processing system are to be written to an output buffer once they are generated, the method comprising:

the graphics processing system, when a tile for output to the output buffer has been completed, comparing that tile to at least one tile already stored in the output buffer, and determining whether or not to write the completed tile to the output buffer on the basis of the comparison.

According to a fifth aspect of the technology described in this application, there is provided a graphics processing system, comprising:

a tile-based graphics processor comprising means for generating output tiles of an output to be provided by the graphics processor;

means for writing an output tile generated by the graphics processor to an output buffer once the output tile has been completed; and wherein:

the graphics processing system further comprises:

means for comparing an output tile that has been completed to at least one tile already stored in the output buffer and for determining whether or not to write the completed tile to the output buffer on the basis of that comparison.

According to a sixth aspect of the technology described in this application, there is provided a tile-based graphics processor comprising:

means for generating output tiles of an output to be provided by the graphics processor;

means for writing an output tile generated by the graphics processor to an output buffer once the output tile has been completed; and means for comparing an output tile the graphics processor has completed to at least one tile already stored in the output buffer and for determining whether or not to write the completed tile to the output buffer on the basis of that comparison.

As will be appreciated by those skilled in the art, these aspects and embodiments of the technology described in this application can and preferably do include any one or more or all of the preferred and optional features of the technology described in this application, as appropriate. Thus, for example, output buffer in one preferred embodiment is the frame buffer.

In these aspects and arrangements of the technology described in this application, the (rendering) tiles that the render target (the output data array) is divided into for rendering purposes can be any desired and suitable size or shape. The rendered tiles are preferably all the same size and shape, as is known in the art, although this is not essential. In a preferred embodiment, each rendered tile is rectangular, and preferably 16×16, 32×32 or 8×8 sampling positions in size.

In a particularly preferred embodiment, the technology described in this application may be, and preferably is, also or instead performed using data blocks of a different size and/or shape to the tiles that the rendering process operates on (produces).

For example, in a preferred embodiment, a or each data block that is considered and compared in the technology described in this application may be made up of a set of plural "rendered" tiles, and/or may comprise only a sub-portion of a rendered tile. In these cases there may be an intermediate stage that, in effect, "generates" the desired data block from the rendered tile or tiles that the graphics processor generates.

In one preferred embodiment, the same block (region) configuration (size and shape) is used across the entire output array of data. However, in another preferred embodiment, different block configurations (e.g. in terms of their size and/or shape) are used for different regions of a given output data array. Thus, in one preferred embodiment, different data block sizes may be used for different regions of the same output data array.

In a particularly preferred embodiment, the block configuration (e.g. in terms of the size and/or shape of the blocks being considered) can be varied in use, e.g. on an output data array (e.g. output frame) by output data array basis. Most preferably the block configuration can be adaptively changed in use, for example, and preferably, depending upon the number or rate of output buffer transactions that are being eliminated (avoided). For example, and preferably, if it is found that using a particular block size only results in a low probability of a block not needing to be written to the output buffer, the block size being considered could be changed for subsequent output arrays of data (e.g., and preferably, made smaller) to try to increase the probability of avoiding the need to write blocks of data to the output buffer.

Where the data block size is varied in use, then that may be done, for example, over the entire output data array, or over only particular portions of the output data array, as desired.

The comparison of the newly generated output data block (e.g. rendered tile) with a data block already stored in the output (e.g. frame) buffer can be carried out as desired and in any suitable manner. The comparison is preferably so as to determine whether the new data block is the same as (or at least sufficiently similar to) the already stored data block or not. Thus, for example, some or all of the content of the new data block may be compared with some or all of the content of the already stored data block.

In a particularly preferred embodiment, the comparison is performed by comparing information representative of and/or derived from the content of the new output data block with information representative of and/or derived from the content of the stored data block, e.g., and preferably, to assess the similarity or otherwise of the data blocks.

The information representative of the content of each data block (e.g. rendered tile) may take any suitable form, but is preferably based on or derived from the content on the data block. Most preferably it is in the form of a "signature" for the data block which is generated from or based on the content of the data block. Such a data block content "signature" may comprise, e.g., and preferably, any suitable set of derived information that can be considered to be representative of the content of the data block, such as a checksum, a CRC, or a hash value, etc., derived from (generated for) the data block. Suitable signatures would include standard CRCs, such as CRC32, or other forms of signature such as MD5, SHA-1, etc.

Thus, in a particularly preferred embodiment, a signature indicative or representative of, and/or that is derived from, the content of the data block is generated for each data block that is to be compared, and the comparison process comprises comparing the signatures of the respective data blocks.

Thus, in a particularly preferred embodiment, when the system is operating in the manner of the technology described in this application, a signature, such as a CRC value, is generated for each data block that is to be written to the output buffer (e.g. and preferably, for each output rendered tile that is generated). Any suitable "signature" generation process, such as a CRC function or a hash function, can be used to generate the signature for a data block. Preferably the data block (e.g. tile) data is processed in a selected, preferably particular or predetermined, order when generating the data block's signature. This may further help to reduce power consumption. In one preferred embodiment, the data is processed using Hilbert order (the Hilbert curve).

The signatures for the data blocks (e.g. rendered tiles) that are stored in the output (e.g. frame) buffer should be stored appropriately. Preferably they are stored with the output (e.g. frame) buffer. Then, when the signatures need to be compared, the stored signature for a data block can be retrieved appropriately. Preferably the signatures for one or more data blocks, and preferably for a plurality of data blocks, can be and are cached locally to the comparison stage or means, e.g. on the graphics processor itself, for example in an on-chip signature (e.g., CRC) buffer. This may avoid the need to fetch a data block's signature from an external buffer every time a comparison is to be made, and so help to reduce the memory bandwidth used for reading the signatures of data blocks.

Where representations of data block content, such as data block signatures, are cached locally, e.g., stored in an on-chip buffer, then the data blocks are preferably processed in a suitable order, such as a Hilbert order, so as to increase the likelihood of matches, with the data block(s) whose signatures, etc., are cached locally (stored in the on-chip buffer).

Although, as will be appreciated by those skilled in the art, the generation and storage of a signature for data blocks (e.g. rendered tiles) will require some processing and memory resource, the Applicants believe that this will be outweighed by the potential savings in terms of power consumption and memory bandwidth that can be provided by the technology described in this application.

It would, e.g., be possible to generate a single signature for an, e.g., RGBA, data block (e.g. rendered tile), or a separate signature (e.g. CRC) could be generated for each colour plane. Similarly, colour conversion could be performed and a separate signature generated for the Y, U, V planes if desired.

As will be appreciated by those skilled in the art, the longer the signature that is generated for a data block is (the more accurately the signature represents the data block), the less likely there will be a false "match" between signatures (and thus, e.g., the erroneous non-writing of a new data block to the output buffer). Thus, in general, a longer or shorter signature (e.g. CRC) could be used, depending on the accuracy desired (and as a trade-off relative to the memory and processing resources required for the signature generation and processing, for example).

In a particularly preferred embodiment, the signature is weighted towards a particular aspect of the data block's content as compared to other aspects of the data block's content (e.g., and preferably, to a particular aspect or part of the data for the data block (the data representing the data block's content)). This may allow, e.g., a given overall length of signature to provide better overall results by weighting the signature to those parts of the data block content (data) that will have more effect on the overall output (e.g. as perceived by a viewer of the image).

In a preferred such embodiment, a longer (more accurate) signature is generated for the MSB bits of a colour as compared to the LSB bits of the colour. (In general, the LSB bits of a colour are less important than the MSB bits, and so the Applicants have recognised that it may be acceptable to use a relatively inaccurate signature for the LSB bits, as errors in comparing the LSB bits for different output data blocks (e.g. rendered tiles) will, the Applicants believe, have a less detrimental effect on the overall output.)

It would also be possible to use different length signatures for different applications, etc., depending upon the, e.g., application's, e.g., display, requirements. This may further help to reduce power consumption. Thus, in a preferred embodiment, the length of the signature that is used can be varied in use. Preferably the length of the signature can be changed depending upon the application in use (can be tuned adaptively depending upon the application that is in use).

In a particularly preferred embodiment, the completed data block (e.g. rendered tile) is not written to the output buffer if it is determined as a result of the comparison that the data block should be considered to be the same as a data block that is already stored in the output buffer. This thereby avoids writing to the output buffer a data block that is determined to be the same as a data block that is already stored in the output buffer.

Thus, in a particularly preferred embodiment, the technology described in this application comprises comparing a signature representative of the content of a data block (e.g. a rendered tile) with the signature of a data block (e.g. tile) stored in the output (e.g. frame) buffer, and if the signatures are the same, not writing the (new) data block (e.g. tile) to the output buffer (but if the signatures differ, writing the (new) data block (e.g. tile) to the output buffer).

Where the comparison process requires an exact match between data blocks being compared (e.g. between their signatures) for the block to be considered to match such the new block is not written to the output buffer, then, if one ignores any effects due erroneously matching blocks, the technology described in this application should provide an, in effect, lossless process. If the comparison process only requires a sufficiently similar (but not exact) match, then the process will be "lossy", in that a data block may be substituted by a data block that is not an exact match for it.

The current, completed data block (e.g. rendered tile) (e.g., and preferably, its signature) can be compared with one, or with more than one, data block that is already stored in the output buffer.

Preferably at least one of the stored data blocks (e.g. tiles) the (new) data block is compared with (or the only stored data block that the (new) data block is compared with) comprises the data block in the output buffer occupying the same position (the same data block (e.g. tile) position) as the completed, new data block is to be written to. Thus, in a preferred embodiment, the newly generated data block is compared with the equivalent data block (or blocks, if appropriate) already stored in the output buffer.

In one preferred embodiment, the current (new) data block is compared with a single stored data block only.

In another preferred embodiment, the current, completed data block (e.g. its signature) is compared to (to the signatures of) plural data blocks that are already stored in the output buffer. This may help to further reduce the number of data blocks that need to be written to the output buffer, as it will allow the writing of data blocks that are the same as data blocks in other positions in the output buffer to be eliminated.

In this case, where a data block matches to a data block in a different position in the output buffer, the system preferably outputs and stores an indication of which already stored data block is to be used for the data block position in question. For example a list that indicates whether the data block is the same as another data block stored in the output buffer having a different data block position (coordinate) may be maintained. Then, when reading the data block for, e.g., display purposes, the corresponding list entry may be read, and if it is, e.g., "null", the "normal" data block is read, but if it contains the address of a different data block, that different data block is read.

Where a data block is compared to plural data blocks that are already stored in the output buffer, then while each data block could be compared to all the data blocks in the output buffer, preferably each data block is only compared to some, but not all, of the data blocks in the output buffer, such as, and preferably, to those data blocks in the same area of the output data array as the new data block (e.g. those data blocks covering and surrounding the intended position of the new data block). This will provide an increased likelihood of detecting data block matches, without the need to check all the data blocks in the output buffer.

In one preferred embodiment, each and every data block that is generated for an output data array is compared with a stored data block or blocks. However, this is not essential, and so in another preferred embodiment, the comparison is carried out in respect of some but not all of the data blocks of a given output data array (e.g. output frame).

In a particularly preferred embodiment, the number of data blocks that are compared with a stored data block or blocks for respective output data arrays is varied, e.g., and preferably, on an output array by output array (e.g. frame-by-frame), or over sequences of output arrays (e.g. frames), basis. This is preferably based on the expected correlation (or not) between successive output data arrays (e.g. frames).

Thus the technology described in this application preferably comprises means for or a step of selecting the number of the data blocks that are to be written to the output buffer that are to be compared with a stored data block or blocks for a given output data array.

Preferably, fewer data blocks are subjected to a comparison when there is (expected to be) little correlation between different output data arrays (such that, e.g., signatures are generated on fewer data blocks in that case), whereas more (and preferably all) of the data blocks in an output data array are subjected to the comparison stage (and have signatures generated for them) when there is (expected to be) a lot of correlation between different output data arrays (such that it should be expected that a lot of newly generated data blocks will be duplicated in the output buffer). This helps to reduce the amount of comparisons and signature generation, etc., that will be performed (which will consume power and resources) where it might be expected that fewer data blocks write transactions will be eliminated (where there is little correlation between output data arrays), whilst still facilitating the use of the comparison process of the technology described in this application where that might be expected to be particularly beneficial (i.e. where there is a lot of correlation between output data arrays).

In these arrangements, the amount of (expected) correlation between different (e.g. successive) output data arrays is preferably estimated for this purpose. This can be done as desired, but is preferably based on the correlation between earlier output data arrays. Most preferably the number of matching data blocks in previous pairs or sequences of output data arrays (as determined, e.g., and preferably, by comparing the data blocks in the manner of the technology described in this application), and most preferably in the immediately preceding pair of output data arrays (e.g. output frames), is used as a measure of the expected correlation for the current output data array. Thus, in a particularly preferred embodiment, the number of data blocks found to match in the previous output data array is used to select how many data blocks in the current output data array should be compared in the manner of the technology described in this application.

In a particularly preferred embodiment, the number of data blocks that are compared in the manner of the technology described in this application can be, and preferably is, varied as between different regions of the output data array. In one such arrangement, this is based on the location of previous data block matches within an output array, i.e. such that an estimate of those regions of an output array that are expected to have a high correlation (and vice-versa) is determined and then the number of data blocks in different regions of the output array to be processed in the manner of the technology described in this application controlled and selected accordingly. For example, and preferably, the location of previous data block matches may be used to determine whether and which regions of the output array are likely to remain the same and the number of data blocks processed in the manner of the technology described in this application then increased in those regions.

In a preferred embodiment, it is possible for the software application (e.g. that is to use and/or receive the output array generated by the graphics processing system) to indicate and control which regions of the output data array are processed in the manner of the technology described in this application, and in particular, and preferably, to indicate which regions of the output array the data block signature calculation process should be performed for. This would then allow the signature calculation to be "turned off" by the application for regions of the output array the application "knows" will be always updated.

This may be achieved as desired. In a preferred embodiment registers are provided that enable/disable data block (e.g. rendered tile) signature calculations for output array regions, and the software application then sets the registers accordingly (e.g. via the graphics processor driver). The number of such registers may be chosen, e.g., as a trade-off between the extra logic required for the registers, the desired granularity of control, and the potential savings from being able to disable the signature calculations.

In a particularly preferred embodiment, the system is configured to always write a newly generated data block to the output buffer periodically, e.g., once a second, in respect of each given data block (data block position). This will then ensure that a new data block is written into the output buffer at least periodically for every data block position, and thereby avoid, e.g., erroneously matched data blocks (e.g. because the data block signatures happen to match even though the data blocks' content actually varies) being retained in the output buffer for more than a given, e.g. desired or selected, period of time.

This may be done, e.g., by simply writing out an entire new output data array periodically (e.g. once a second). However, in a particularly preferred embodiment, new data blocks are written out to the output buffer individually on a rolling basis, so that rather than writing out a complete new output array in one go, a selected portion of the data blocks in the output array are written out to the output buffer each time a new output array is being generated, in a cyclic pattern so that over time all the data blocks are eventually written out as new. In one preferred such arrangement, the system is configured such that a (different) selected 1/nth portion (e.g. twenty-fifth) of the data blocks are written out completely each output array (e.g. frame), so that by the end of a sequence of n (e.g. 25) output arrays (e.g. frames), all the data blocks will have been written to the output buffer completely at least once.

This operation is preferably achieved by disabling the data block comparisons for the relevant data blocks (i.e. for those data blocks that are to be written to the output buffer in full). (Data block signatures are preferably still generated for the data blocks that are written to the output buffer in full, as that will then allow those blocks to be compared with future data blocks.)

Where the technology described in this application is to be used with a double-buffered output (e.g. frame) buffer, i.e. an output buffer which stores two output arrays (e.g. frames) concurrently, e.g. one being displayed and one that has been displayed and is therefore being written to as the next output array (e.g. frame) to display, then the comparison process of the technology described in this application preferably compares the newly generated data block with the oldest output array in the output buffer (i.e. will compare the newly generated data block with the output array that is not currently being displayed, but that is being written to as the next output array to be displayed).

In a particularly preferred embodiment, the technology described in this application is used in conjunction with another frame (or other output) buffer power and bandwidth reduction scheme or schemes, such as, and preferably, output (e.g. frame) buffer compression (which may be lossy or lossless, as desired).

In a preferred arrangement of the latter case, if after the comparison process the newly generated data block is to be written to the output (e.g. frame) buffer, the data block would then be accordingly compressed before it is written to the output (e.g. frame) buffer.

Where a data block is to undergo some further processing, such as compression, before it is written to the output buffer, then it would be possible, e.g., to perform the additional processing, such as compression, on the data block anyway, and then to write the so-processed data block to the output buffer or not on the basis of the comparison. However, in a particularly preferred embodiment, the comparison process of the technology described in this application is performed first, and the further processing, such as compression, of the data block only performed if it is determined that the data block is to be written to the output buffer. This will then allow the further processing of the data block to be avoided if it is determined that the block does not need to be written to the output buffer.

The tile comparison process (and signature generation, where used) may be implemented in an integral part of the graphics processor, or there may, e.g., be a separate "hardware element" that is intermediate the graphics processor and the output (e.g. frame) buffer.

In a particularly preferred embodiment, there is a "transaction elimination" hardware element that carries out the comparison process and controls the writing (or not) of the data blocks to the output buffer. This hardware element preferably also does the signature generation (and caches signatures of stored data blocks) where that is done. Similarly, where the data blocks that the technology described in this application operates on are not the same as the, e.g., rendered tiles that the rendering process produces, this hardware element preferably generates or assembles the data blocks from the rendered tiles that the rendering process generates.

In one preferred embodiment, this hardware element is separate to the graphics processor, and in another preferred embodiment is integrated in (part of) the graphics processor. Thus, in one preferred embodiment, the comparison means, etc., is part of the graphics processor itself, but in another preferred embodiment, the graphics processing system comprises a graphics processor, and a separate "transaction elimination" unit or element that comprises the comparison means, etc.

The technology described in this application can be used irrespective of the form of output that the graphics processor may be providing to the output buffer. Thus, for example, it may be used where the data blocks and the output data array are intended to form an image for display (e.g. on a screen or printer) (and in one preferred embodiment this is the case). However, the technology described in this application may also be used where the output is not intended for display, for example where the output data array (render target) is a texture that the graphics processor is being used to generate (e.g. in "render to texture" operation), or, indeed, where the output the graphics processor is being used to generate is any other form of data array.

Similarly, although the technology described in this application has been described above with particular reference to graphics processor operation, the Applicants have recognised that the principles of the technology described in this application can equally be applied to other systems that process data in the form of blocks in a similar manner to, e.g., tile-based graphics processing systems. Thus the technology described in this application may equally be used, for example, for video processing (as video processing operates on blocks of data analogous to tiles in graphics processing), and for composite image processing (as again the composition frame buffer will be processed as distinct blocks of data).

The technology described in this application may also be used, e.g., where digital cameras are processing data (images) generated by the camera's sensor. A camera (video or still) may, e.g. process the image generated by its sensor on a block-by-block basis for storing in memory. In this case, the data from the camera's sensor, could, e.g., be processed as discussed above by the camera's controller to control the writing of the image data to memory.

Thus, according to a seventh aspect of the technology described in this application, there is provided a method of operating a data processing system in which data generated by the data processing system is used to form an output array of data in an output buffer, the method comprising:

the data processing system storing the output array of data in the output buffer by writing blocks of data representing particular regions of the output array of data to the output buffer; and the data processing system, when a block of data is to be written to the output buffer, comparing that block of data to at least one block of data already stored in the output buffer, and determining whether or not to write the block of data to the output buffer on the basis of the comparison.

According to an eighth aspect of the technology described in this application, there is provided a data processing system, comprising:

a data processor comprising means for generating data to form an output array of data to be provided by the data processor;

means for storing data generated by the data processor as an array of data in an output buffer by writing blocks of data representing particular regions of the array of data to the output buffer; and wherein:

the data processing system further comprises:

means for comparing a block of data that is ready to be written to the output buffer to at least one block of data already stored in the output buffer and for determining whether or not to write the block of data to the output buffer on the basis of that comparison.

According to a ninth aspect of the technology described in this application, there is provided a data processor comprising:

means for writing a block of data generated by the data processor and representing a particular region of an output array of data to be provided by the data processor to an output buffer; and means for comparing a block of data that is ready to be written to the output buffer to at least one block of data already stored in the output buffer and for determining whether or not to write the block of data to the output buffer on the basis of that comparison.

The technology described in this application also extends to the provision of a particular hardware element for performing the comparison and consequent determination of the technology described in this application. As discussed above, this hardware element (logic) may, for example, be provided as an integral part of a, e.g., graphics processor, or may be a standalone element that can, e.g., interface between a graphics processor, for example, and an external memory controller. It may be a programmable or dedicated hardware element.

Thus, according to a tenth aspect of the technology described in this application, there is provided a write transaction elimination apparatus for use in a data processing system in which an output array of data generated by the data processing system is stored in an output buffer by writing blocks of data representing particular regions of the output array of data to the output buffer, the apparatus comprising:

means for comparing a block of data that is ready to be written to the output buffer with at least one block of data already stored in the output buffer, and for determining whether or not to write the block of data to the output buffer on the basis of the comparison.

As will be appreciated by those skilled in the art, all these aspects and embodiments of the technology described in this application can and preferably do include any one or more or all of the preferred and optional features of the technology described in this application described herein. Thus, for example, the comparison preferably comprises comparing signatures representative of the contents of the respective data blocks.

In these arrangements, the data blocks may, e.g., be, and preferably are, rendered tiles produced by a tile-based graphics processing system (a graphics processor), video data blocks produced by a video processing system (a video processor), and/or composite frame tiles produced by a composition processing system, etc.

As discussed above, in one particularly preferred embodiment, the other data block or blocks that the generated data block is compared to are data blocks that are already stored in the output buffer.

Thus, in a particularly preferred embodiment, the data block comparison comprises (a step of or means for) comparing a block of data that has been generated for the output data array (e.g. and preferably that is ready to be written to the output buffer) to at least one other block of data already stored in the output buffer (and then determining whether to write the new block of data to the output buffer on the basis of that comparison).

In this case, the block(s) of data already stored in the output buffer may be a block (or blocks) of data from a previous data array (i.e. a data array that has previously been stored in the output buffer). Thus, in a preferred embodiment, the generated data block is compared with a block or blocks from the previous output data array. In one preferred embodiment the generated data block is compared only with a block or blocks from the previous output data array.

Thus, in a particularly preferred embodiment, the comparison includes data blocks from a previous data array that is already stored in the output (e.g. frame) buffer. This may then avoid having to write a similar data block again to the output buffer for the current (new) data array if it is already present in the output buffer from a previous data array. This may particularly be useful where a series of similar data arrays (such as frames of a video sequence) is being generated.

However, other arrangements would be possible. For example, the data block comparison process may compare the data block that has been generated with another block that has been generated for the output data array in question (for the current (same) data array).

Thus, according to a further aspect of the technology described in this application, there is provided a method of operating a graphics processing system in which data generated by the graphics processing system is used to form an output array of data in an output buffer, the method comprising:

the graphics processing system storing the output array of data in the output buffer by writing blocks of data representing particular regions of the output array of data to the output buffer; and the graphics processing system, when a block of data has been generated for the output data array, comparing that block of data to at least one other block of data that has been generated for the output data array, and determining whether or not to write the generated block of data to the output buffer on the basis of the comparison.

According to a further aspect of the technology described in this application, there is provided a graphics processing system, comprising:

a graphics processor comprising means for generating data to form an output array of data to be provided by the graphics processor;

means for storing data generated by the graphics processor as an array of data in an output buffer by writing blocks of data representing particular regions of the array of data to the output buffer; and wherein:

the graphics processing system further comprises:

means for comparing a block of data that has been generated for the output data array to at least one other block of data that has been generated for the output data array and for determining whether or not to write the generated block of data to the output buffer on the basis of that comparison.

According to a further aspect of the technology described in this application, there is provided a graphics processor comprising:

means for writing a block of data generated by the graphics processor and representing a particular region of an output array of data to be provided by the graphics processor to an output buffer; and means for comparing a block of data that has been generated for an output data array to at least one other block of data that has been generated for the output data array and for determining whether or not to write the block of data to the output buffer on the basis of that comparison.

According to a further aspect of the technology described in this application, there is provided a method of operating a tile-based graphics processing system in which rendered tiles generated by the graphics processing system are to be written to an output buffer once they are generated, the method comprising:

the graphics processing system, when a tile for output to the output buffer has been completed, comparing that tile to at least one other tile to be stored in the output buffer, and determining whether or not to write the completed tile to the output buffer on the basis of the comparison.

According to a further aspect of the technology described in this application, there is provided a graphics processing system, comprising:

a tile-based graphics processor comprising means for generating output tiles of an output to be provided by the graphics processor;

means for writing an output tile generated by the graphics processor to an output buffer once the output tile has been completed; and wherein:

the graphics processing system further comprises:

means for comparing an output tile that has been completed to at least one tile to be stored in the output buffer and for determining whether or not to write the completed tile to the output buffer on the basis of that comparison.

According to a further aspect of the technology described in this application, there is provided a tile-based graphics processor comprising:

means for generating output tiles of an output to be provided by the graphics processor;

means for writing an output tile generated by the graphics processor to an output buffer once the output tile has been completed; and means for comparing an output tile the graphics processor has completed to at least one tile to be stored in the output buffer and for determining whether or not to write the completed tile to the output buffer on the basis of that comparison.

According to a further aspect of the technology described in this application, there is provided a method of operating a data processing system in which data generated by the data processing system is used to form an output array of data in an output buffer, the method comprising:

the data processing system storing the output array of data in the output buffer by writing blocks of data representing particular regions of the output array of data to the output buffer; and the data processing system, when a block of data has been generated for the output data array, comparing that block of data to at least one other block of data that has been generated for the output data array, and determining whether or not to write the generated block of data to the output buffer on the basis of the comparison.

According to a further aspect of the technology described in this application, there is provided a data processing system, comprising:

a data processor comprising means for generating data to form an output array of data to be provided by the data processor;

means for storing data generated by the data processor as an array of data in an output buffer by writing blocks of data representing particular regions of the array of data to the output buffer; and wherein:

the data processing system further comprises:

means for comparing a block of data that has been generated for the output data array to at least one other block of data that has been generated for the output data array and for determining whether or not to write the generated block of data to the output buffer on the basis of that comparison.

According to a further aspect of the technology described in this application, there is provided a data processor comprising:

means for writing a block of data generated by the data processor and representing a particular region of an output array of data to be provided by the data processor to an output buffer; and means for comparing a block of data that has been generated for the output data array to at least one other block of data that has been generated for the output data array and for determining whether or not to write the generated block of data to the output buffer on the basis of that comparison.

According to a further aspect of the technology described in this application, there is provided a write transaction elimination apparatus for use in a data processing system in which an output array of data generated by the data processing system is stored in an output buffer by writing blocks of data representing particular regions of the output array of data to the output buffer, the apparatus comprising:

means for comparing a block of data that has been generated for the output data array with at least one other block of data that has been generated for the output data array, and for determining whether or not to write the generated block of data to the output buffer on the basis of the comparison.

As will be appreciated by those skilled in the art, these aspects and embodiments of the technology described in this application can and preferably do include any one or more or all of the preferred and optional features of the technology described in this application described herein, as appropriate. Thus, for example, output buffer in one preferred embodiment is the frame buffer and the comparison of the newly generated output data block (e.g. rendered tile) with another data block preferably comprises comparing some or all of the content of the new data block with some or all of the content of the other data block or comparing information, such as a signature, representative of and/or derived from the content of the new output data block with information representative of and/or derived from the content of the other data block.

Similarly, in a particularly preferred embodiment, the completed data block (e.g. rendered tile) is not written to the output buffer if it is determined as a result of the comparison that the data block should be considered to be the same as another data block for the output array, and the current, completed data block (e.g. rendered tile) can be compared with one, or with more than one, other data block.

In a particularly preferred such arrangement, the data block comparison process is performed in respect of (by comparing) blocks being generated for the same data array (the current data array) only.

In this case, the comparison, for example, may be with data blocks for the current array that have already been stored in the output buffer, and/or the comparison may be (and in a preferred embodiment is) with other blocks that are being generated for the current output array but that have yet to be stored in the output buffer.

In this case, as each data block to be written to the data array is generated, it may be compared with another data block or blocks of the data array and the new data block then written or not to the data array on the basis of that comparison. Thus, in a particularly preferred embodiment, there is a step of or means for, when a data block for the data array has been completed, comparing that data block to at least one other data block for the data array, and determining whether or not to write the completed data block to the data array on the basis of the comparison.

In one particularly preferred embodiment, the data block comparison is with both data blocks for the present (current) data array and data blocks of a previous data array that are already stored in the output buffer.

Thus, in a preferred embodiment, the comparison is with data blocks that are to be stored in the output buffer, or that are already stored in the output buffer, or with both.

Where there is a comparison with other data blocks for the current output data array, such that a data block generated for the array may not be written to the output buffer even though there may not be a data block already in the output buffer for the data block position in question, although the data block itself may not be written to the output buffer, preferably meta-data for the block position in question indicating which other block of the data array should be processed is generated and stored for the block position in question. This will then allow any device that is to use or process the data array to identify which other data block of the data array to process for the block in question.

Thus, as in the case where a data block matches to a data block in a different position in the data array, the system preferably outputs and stores an indication of which other data block is to be used for the data block position in question. For example a list that indicates whether the data block is the same as another data block in the output data array having a different data block position (coordinate) may be maintained. Then, when reading the data block for, e.g., display purposes, the corresponding list entry may be read, and if it is, e.g., "null", the "normal" data block is read, but if it contains the address of a different data block, that different data block is read. This will then allow any device reading the output array in that case to know which data block to process in place of the data block that was not written to the output buffer for the data array.

According to a further aspect of the technology described in this application, there is provided a method of operating a graphics processing system in which data generated by the graphics processing system is used to form an output array of data in an output buffer, the method comprising:

the graphics processing system storing the output array of data in the output buffer by writing blocks of data representing particular regions of the output array of data to the output buffer; and the graphics processing system, when a block of data has been generated for the output data array, comparing that block of data to at least one other block of data, and determining whether or not to write the generated block of data to the output buffer on the basis of the comparison.

According to a further aspect of the technology described in this application, there is provided a graphics processing system, comprising:

a graphics processor comprising means for generating data to form an output array of data to be provided by the graphics processor;

means for storing data generated by the graphics processor as an array of data in an output buffer by writing blocks of data representing particular regions of the array of data to the output buffer; and wherein:

the graphics processing system further comprises:

means for comparing a block of data that has been generated for the output data array to at least one other block of data and for determining whether or not to write the generated block of data to the output buffer on the basis of that comparison.

According to a further aspect of the technology described in this application, there is provided a graphics processor comprising:

means for writing a block of data generated by the graphics processor and representing a particular region of an output array of data to be provided by the graphics processor to an output buffer; and means for comparing a block of data that has been generated for an output data array to at least one other block of data and for determining whether or not to write the block of data to the output buffer on the basis of that comparison.

According to a further aspect of the technology described in this application, there is provided a method of operating a data processing system in which data generated by the data processing system is used to form an output array of data in an output buffer, the method comprising:

the data processing system storing the output array of data in the output buffer by writing blocks of data representing particular regions of the output array of data to the output buffer; and the data processing system, when a block of data has been generated for the output data array, comparing that block of data to at least one other block of data, and determining whether or not to write the generated block of data to the output buffer on the basis of the comparison.

According to a further aspect of the technology described in this application, there is provided a data processing system, comprising:

a data processor comprising means for generating data to form an output array of data to be provided by the data processor;

means for storing data generated by the data processor as an array of data in an output buffer by writing blocks of data representing particular regions of the array of data to the output buffer; and wherein:

the data processing system further comprises:

means for comparing a block of data that has been generated for the output data array to at least one other block of data and for determining whether or not to write the generated block of data to the output buffer on the basis of that comparison.

According to a further aspect of the technology described in this application, there is provided a data processor comprising:

means for writing a block of data generated by the data processor and representing a particular region of an output array of data to be provided by the data processor to an output buffer; and means for comparing a block of data that has been generated for the output data array to at least one other block of data and for determining whether or not to write the generated block of data to the output buffer on the basis of that comparison.

According to a further aspect of the technology described in this application, there is provided a write transaction elimination apparatus for use in a data processing system in which an output array of data generated by the data processing system is stored in an output buffer by writing blocks of data representing particular regions of the output array of data to the output buffer, the apparatus comprising:

means for comparing a block of data that has been generated for the output data array with at least one other block of data, and for determining whether or not to write the generated block of data to the output buffer on the basis of the comparison.

As will be appreciated by those skilled in the art, all these aspects and embodiments of the technology described in this application can and preferably do include any one or more or all of the preferred and optional features of the technology described in this application described herein.

It would also be possible to use the technology described in this application where there are, for example, plural masters all writing data blocks to the output buffer. This may be the case, for example, when a host processor generates an "overlay" to be displayed on an image that is being generated by a graphics processor.

In such a case, all of the different master devices may, for example, have their outputs subjected to the data block comparison process. Alternatively, the data block comparison process may be disabled when there are two or more master devices generating data blocks for the output data array. In this case, the comparison process may, e.g., be disabled for the entire output data array, or only for those portions of the output data array for which it is possible that two master devices may be generating output data blocks (e.g., only for the region of the output data array where the host processor's "overlay" is to appear).

In a particularly preferred embodiment, the data block signatures that are generated for use in the technology described in this application are "salted" (i.e. have another number (a salt value) added to the generated signature value) when they are created. The salt value may conveniently be, e.g., the data output array (e.g. frame) number since boot, or a random value. This will, as is known in the art, help to make any error caused by any inaccuracies in the comparison process of the technology described in this application non-deterministic (i.e. avoid, for example, the error always occurring at the same point for repeated viewings of a given sequence of images such as, for example, where the process is being used to display a film or television programme).

Typically the same salt value will be used for a frame. The salt value may be updated for each frame or periodically. For periodic salting it is beneficial to change the salt value at the same time as the signature comparison is invalidated (where that is done), to minimise bandwidth to write the signatures.

The Applicants have further recognised that the techniques of the technology described in this application can be used to assess or estimate the correlation between successive, and/or sequences of, output data arrays (e.g. frames) (i.e. the extent to which output data arrays (e.g. frames) are similar to each other) in, e.g., tile-based graphics processing systems, by, e.g., counting the number of data block (e.g. tile) "matches" that the technology described in this application identifies. Moreover, the Applicants have recognised that this information would be useful, for example because if it indicates that successive frames are the same (the correlation is high) that would suggest, e.g., that the image is static for a period of time. If that is the case, then, e.g., it may be possible to reduce the frame rate.

Thus, according to a further aspect of the technology described in this application, there is provided a method of operating a data processing system in which an output array of data is generated by the data processing system writing blocks of data representing particular regions of the output array of data to an output buffer for storing the output array of data, the method comprising:

the data processing system, when a block of data is to be written to the output buffer, comparing that block of data to at least one block of data already stored in the output buffer, and using the results of the comparisons for plural blocks of data to estimate the correlation between different output arrays of the data processing system.

According to another aspect of the technology described in this application, there is provided a data processing system comprising:

means for generating data to form an output array of data to be provided by the data processing system;

means for storing data generated by the data processing system as an array of data in an output buffer by writing blocks of data representing particular regions of the array of data to the output buffer; and means for comparing a data block that is to be written to the output buffer to at least one data block already stored in the output buffer; and means for using the results of the comparisons for plural blocks of data to estimate the correlation between different output arrays of the data processing system.

As will be appreciated by those skilled in the art, all these aspects and embodiments of the technology described in this application can and preferably do include any one or more or all of the preferred and optional features of the technology described in this application described herein. Thus, for example, the comparison preferably comprises comparing signatures representative of the contents of the respective data blocks.

Similarly, the data blocks may, e.g., be, and preferably are, rendered tiles produced by a tile-based graphics processing system, video data blocks produced by a video processing system, and/or composite frame tiles produced by a composition processing system, etc.

In these arrangements, the estimated correlation between the different output arrays (e.g. frames) is preferably used to control a further process of the system in relation to the output arrays or frames, such as their frequency of generation and/or format, etc. Thus, in a particularly preferred embodiment, the output array (frame) generation rate and/or display fresh rate, and/or the form of anti-aliasing used for an output array (frame), is controlled or selected on the basis of the estimated correlation between different output arrays (frames).

The technology described in this application can be implemented in any suitable system, such as a suitably configured micro-processor based system. In a preferred embodiment, the technology described in this application is implemented in computer and/or micro-processor based system.

The various functions of the technology described in this application can be carried out in any desired and suitable manner. For example, the functions of the technology described in this application can be implemented in hardware or software, as desired. Thus, for example, the various "means" and functional elements of the technology described in this application may comprise a suitable processor or processors; controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

In a preferred embodiment the graphics processor and/or transaction elimination unit is implemented as a hardware element (e.g. ASIC). Thus, in another aspect the technology described in this application comprises a hardware element including the apparatus of, or operated in accordance with the method of, any one or more of the aspects of the technology described herein.

It should also be noted here that, as will be appreciated by those skilled in the art, the various functions, etc., of the technology described in this application may be duplicated and/or carried out in parallel on a given processor.

The technology described in this application is applicable to any suitable form or configuration of graphics processor and renderer, such as processors having a "pipelined" rendering arrangement (in which case the renderer will be in the form of a rendering pipeline). It is particularly applicable to tile-based graphics processors and graphics processing systems.

As will be appreciated from the above, the technology described in this application is particularly, although not exclusively, applicable to 2D and 3D graphics processors and processing devices, and accordingly extends to a 2D and/or 3D graphics processor and a 2D and/or 3D graphics processing platform including the apparatus of, or operated in accordance with the method of, any one or more of the aspects of the technology described in this application described herein. Subject to any hardware necessary to carry out the specific functions discussed above, such a 2D and/or 3D graphics processor can otherwise include any one or more or all of the usual functional units, etc., that 2D and/or 3D graphics processors include.

It will also be appreciated by those skilled in the art that all of the described aspects and embodiments of the technology described in this application can include, as appropriate, any one or more or all of the preferred and optional features described herein.

The methods in accordance with the technology described in this application may be implemented at least partially using software e.g. computer programs. It will thus be seen that when viewed from further aspects the technology described in this application provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The technology described in this application also extends to a computer software carrier comprising such software which when used to operate a graphics processor, renderer or other system comprising data processing means causes in conjunction with said data processing means said processor, renderer or system to carry out the steps of the methods of the technology described in this application. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the technology described in this application need be carried out by computer software and thus from a further broad aspect the technology described in this application provides computer software and such software installed on a computer software carrier for carrying out at least one of the steps of the methods set out herein.

The technology described in this application may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of preferred embodiments of the technology described in this application will now be described by way of example only and with reference to the accompanying drawings, in which.

A number of preferred embodiments of the technology described in this application will now be described. These embodiments will be described primarily with reference to the use of the technology described in this application in a graphics processing system, although, as noted above, the technology described in this application is applicable to other data processing systems which process data in blocks representing portions of a whole output, such as video processing.

Similarly, the following embodiments will be described primarily with reference to the comparison of rendered tiles generated by a tile-based graphics processor in the manner of the technology described in this application, although again and as noted above, the technology described in this application is not limited to such arrangements.

Figure 1:
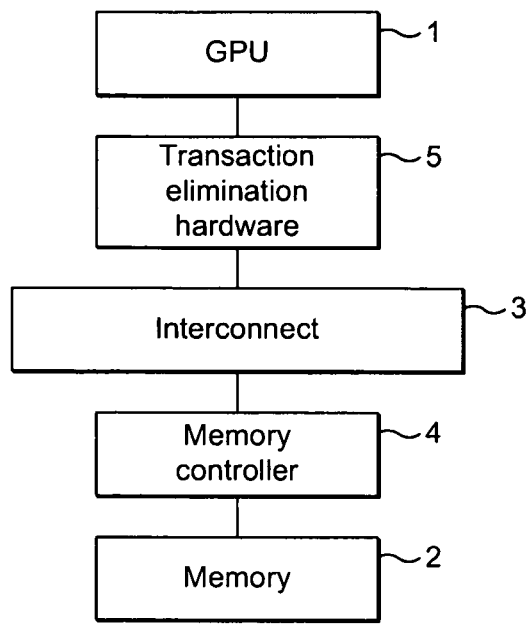
FIG. 1 shows schematically a first embodiment in which the technology described in this application is used in conjunction with a tile-based graphics processor.

FIG. 1 shows schematically an arrangement of a graphics processing system that is in accordance with the technology described in this application.

The graphics processing system includes, as shown in FIG. 1, a tile-based graphics processor or graphics processing unit (GPU) 1, which, as is known in the art, produces tiles of an output data array, such as an output frame to be generated. The output data array may, as is known in the art, typically be an output frame intended for display on a display device, such as a screen or printer, but may also, for example, comprise a "render to texture" output of the graphics processor, etc.

As is known in the art, in such an arrangement, once a tile has been generated by the graphics processor 1, it would then normally be written to the frame buffer in memory 2 (which memory may be DDR-SDRAM) via an interconnect 3 which is connected to a memory controller 4. Sometime later the frame buffer will, e.g., be read by a display controller and output to the display.

In the present embodiment, this process is modified by the use of a transaction elimination hardware unit 5, which controls the writing of tiles generated by the graphics processor 1 to the frame buffer in the memory 2. In essence, and as will be discussed in more detail below, the transaction elimination hardware 5 operates to generate for each tile a signature representative of the content of the tile and then compares that signature with the signature of one or more tiles already stored in the frame buffer to see if the signatures match. (Thus, in this embodiment, the data blocks that are compared comprise rendered tiles generated by the graphics processor.)

If the signatures match, it is then assumed that the new tile is the same as the tile already stored in the frame buffer, and so the transaction elimination hardware unit 5 abstains from writing the new tile to the frame buffer.

In this way, the present embodiment can avoid write traffic for sections of the frame buffer that don't actually change from one frame to the next (in the case of a game, this would typically be the case for much of the user interface, the sky, etc., as well as most of the playfield when the camera position is static). This can save a significant amount of bandwidth and power consumption in relation to the frame buffer operation.

On the other hand, if the signatures do not match, then the new tile is written to the frame buffer and the generated signature for the tile is also written to memory.

Figure 2:
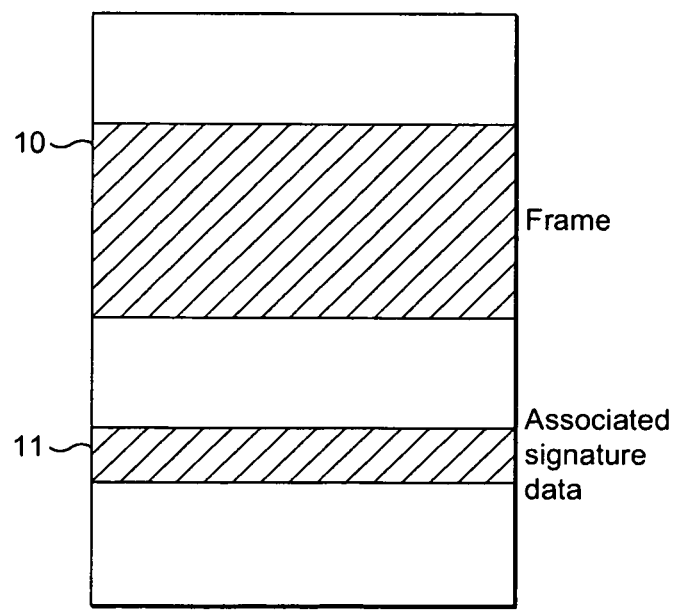
FIG. 2 shows schematically how the relevant data is stored in memory in the first embodiment of the technology described in this application.

FIG. 2 shows an exemplary memory layout for this, in which the tiles making up the frame are stored in one portion 10 of the memory (thus forming the "frame buffer") and the associated signatures for the tiles making up the frame are stored in another portion 11 of the memory. (Other arrangements would, of course, be possible.) For high definition (HD) frames, if one has a 16×16 32-bit tile, then using 32-bit signatures will add 30 KB to an 8 MB frame.

(Where the frame buffer is double-buffered, then preferably signature data is stored for (and with) each frame. A new tile would then be compared with the oldest frame in memory.)

Figure 3:
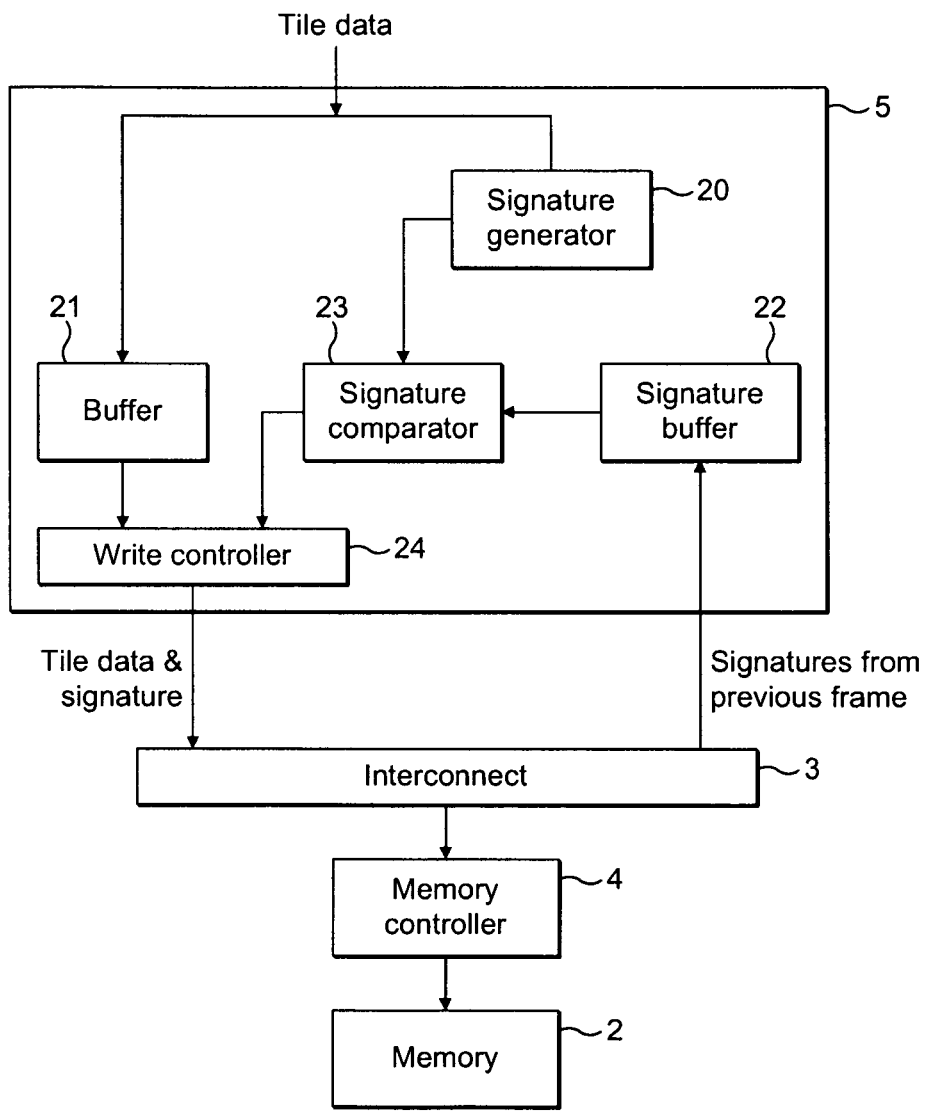
FIG. 3 shows schematically and in more detail the transaction elimination hardware unit of the embodiment shown in FIG. 1.

FIG. 3 shows the transaction elimination hardware unit 5 in more detail.

As shown in FIG. 3, the tile data received by the transaction elimination hardware unit 5 from the graphics processor 1 is passed both to a buffer 21 which temporarily stores the tile data while the signature generation and comparison process takes place, and a signature generator 20.

The signature generator 20 operates to generate the necessary signature for the tile. In the present embodiment the signature is in the form of a 32-bit CRC for the tile.

Other signature generation functions and other forms of signature such as hash functions, etc., could also or instead be used, if desired. It would also, for example, be possible to generate a single signature for an RGBA tile, or a separate signature for each colour plane. Similarly, colour conversion could be performed and a separate signature generated for each of Y, U and V. In order to reduce power consumption, the tile data processed in by the signature generator 20 could be reordered (e.g. using the Hilbert curve), if desired.

Once the signature for the new tile has been generated, it is passed to a signature comparator 23, which operates to compare the signature of the new tile with the signature or signatures of a tile or tiles that is or are already present in the frame buffer. In the present embodiment, the comparison is with the signature of the tile already in the frame buffer at the tile position for the tile in question.

The signatures for plural tiles from the previous frame are cached in a signature buffer 22 (this buffer may be implemented in a number of ways, e.g. buffer or cache) of the transaction elimination hardware unit 5 to facilitate their retrieval in operation of the system, and so the signature comparator 23 fetches the relevant signature from the signature buffer 22 if it is present there (or triggers a fetch of the signature from the main memory 2, as is known in the art), and compares the signature of the previous frame's tile with the signature received from the signature generator to see if there is a match.

If the signatures do not match, then the signature comparator 23 controls a write controller 24 to write the new tile and its signature to the frame buffer and associated signature data store in the memory 2. On the other hand, if the signature comparator finds that the signature of the new tile matches the signature of the tile already stored in the frame buffer, then the write controller 24 invalidates the tile and no data is written to the frame buffer (i.e. the existing tile is allowed to remain in the frame buffer and its signature is retained).

In this way, a tile is only written to the frame buffer in the memory 2 if it is found that by the signature comparison to differ from a tile that is already stored in the memory 2. This helps to reduce the number of write transactions to the memory 2 as a frame is being generated.

In the present embodiment, to stop incorrectly matched tiles from existing for too long a long period of time in the frame buffer, the signature comparison for each stored tile in the frame buffer is periodically disabled (preferably once a second). This then means that when a tile whose signature comparison has been disabled is newly generated, the newly generated tile will inevitably be written to the frame buffer in the memory 2. In this way, it can be ensured that mismatched tiles will over time always be replaced with completely new (and therefore correct) tiles. (With random tiles, a 32-bit CRC, for example, will generate a false match (i.e. a situation where the same signature is generated for tiles having different content) once every $2^{32}$ tiles, which at 1080 HD resolution at 30 frames per second would amount to a tile mismatch due to the comparison process about every 4 hours.)

In the present embodiment, the stored tiles' signature comparisons are disabled in a predetermined, cyclic, sequence, so that each second (and/or over a set of say, 25 or 30 frames), each individual tile will have its signature comparison disabled (and hence a new tile written for it) once.

Other arrangements would be possible. For example, the system could simply be arranged to write out a completely new frame periodically (e.g. once a second), in a similar way to MPEG video. Additionally or alternatively, longer signatures could be used for each tile, as that should then reduce significantly the rate at which any false tile matches due to identical signatures for in fact different tiles occur. For example, a larger CRC such as a 64-bit CRC could reduce such mismatches to once every 1.2 million years.

(Alternatively, as any such false tile matches are unlikely to be perceptible due to the fact that the tiles will in any event still be similar and the mismatched tile is only likely to be displayed for the order of 1/30th of a second or less, it may be decided that no precautions in this regard are necessary.)

It would also be possible to, for example, weight the signature generation to those aspects of a tile's content that are considered to be more important (e.g. in terms of how the user perceives the final displayed tile). For example, a longer signature could be generated for the MSB bits of a colour as compared to the LSB bits of a colour (as in general the LSB bits of a colour are less important than the MSB bits). The length of the signature could also be adapted in use, e.g., depending upon the application, to help minimise power consumption.

In a particularly preferred embodiment, the data block signatures that are generated for use in the technology described in this application are "salted" (i.e. have another number (a salt value) added to the generated signature value) when they are created. The salt value may conveniently be, e.g., the data output array (e.g. frame) number since boot, or a random value. This will, as is known in the art, help to make any error caused by any inaccuracies in the comparison process of the technology described in this application non-deterministic (i.e. avoid, for example, the error always occurring at the same point for repeated viewings of a given sequence of images such as, for example, where the process is being used to display a film or television programme).

As discussed above, in the present embodiment, the signature comparison process operates to compare a newly generated tile with the tile that is stored for the corresponding tile position in the frame buffer.

However, in another preferred embodiment, a given generated tile is compared with multiple tiles already stored in the frame buffer. In this case, the signature generated for the tile will accordingly be compared with the signatures of plural tiles stored in the frame buffer. It is preferred in this case that such comparisons take place with the signatures of the tiles that are stored in the signature buffer 22 of the transaction elimination hardware unit 5 (i.e. with a subset of all the stored tiles for the frame), although other arrangements, such as comparing a new tile with all the stored tiles would be possible if desired. Preferably the tiles are processed in an appropriate order, such as a Hilbert order, in order to increase the likelihood of matches with the tiles whose signatures are stored in the signature buffer 22.

In this case, the signature generated for a new tile will accordingly be compared with the signatures of multiple tiles in the current output frame (which tiles may, as will be appreciated by those skilled in the art, be tiles that have been newly written to the current frame, or tiles from previous frame(s) that have, in effect, been "carried forward" to the present frame because they matched a tile of the present frame).

In this embodiment a list that indicates whether a tile is the same as another tile having a different tile coordinate in the previous frame or not is maintained. Then, on reading a tile to be displayed, the corresponding list entry is read. If the list entry value is null, the data stored in the normal tile position for that tile is read. Otherwise, the list entry will contain the address of a different tile to read, which may, e.g., be automatically translated by the transaction elimination hardware unit 5 to determine the position of the tile in the frame buffer that should be read for the current tile position.

In one preferred embodiment of the technology described in this application, the tile comparison process is carried out for each and every tile that is generated. However, in another preferred embodiment, an adaptive scheme is used where fewer tiles are analysed when there is expected to be little correlation between frames. In this arrangement, the historic number of tile matches is used as a measure of the correlation between the frames (since if there are a lot of tile matches, there can be assumed to be a lot of correlation between frames, and vice-versa). The transaction elimination hardware may include a suitable controller for carrying out this operation.

Thus, in this case, when it is determined that there is a lot of correlation between the frames (i.e. many of the tiles are matched to tiles already present in the frame buffer), then signatures are generated and comparisons carried out for all of the tiles, whereas when it is determined that there is little correlation between frames (such that few or no tiles have been found to match to tiles already stored in the frame buffer), then signatures are generated and the tile comparison process performed for fewer tiles.

Figure 4A:
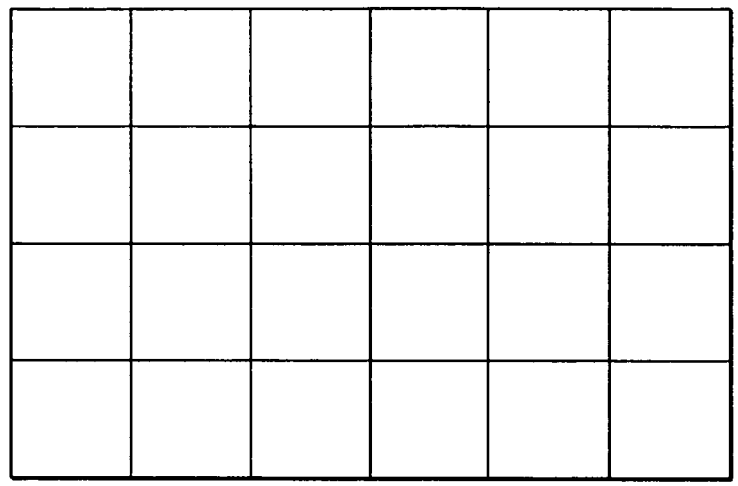
FIGS. 4a and 4b show schematically possible modifications to the operation of a preferred embodiment of the technology described in this application.
Figure 4B:
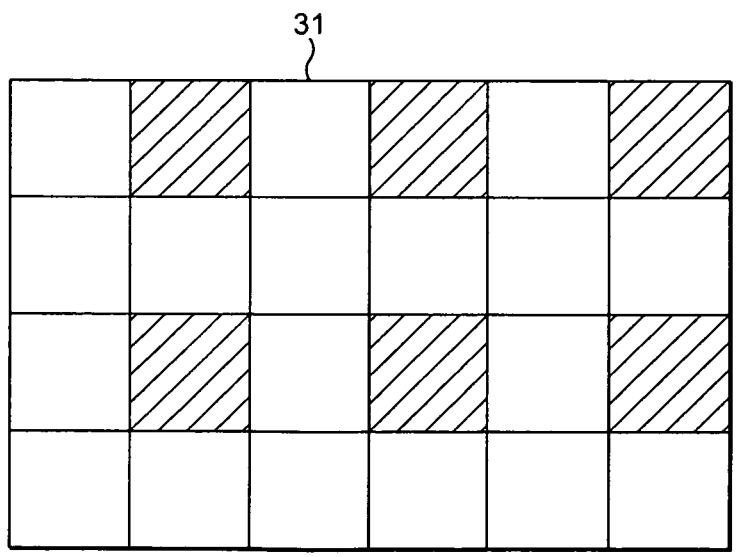

FIG. 4 illustrates this. FIG. 4a shows the case where there is a lot of correlation between frames and so signatures are generated for all tiles. FIG. 4b shows the converse situation where there is little correlation between frames, and so in this case signatures are generated and compared for only a subset 31 of the tiles.

It would also be possible to use these principles to, for example, try to determine which particular portions of the frame have a higher correlation, and then increase the number of tiles that are subject to the comparison in particular regions of the frame only, if desired.

As will be appreciated by those skilled in the art, the transaction elimination hardware unit 5 can operate in respect of any output that the graphics processor 1 is producing, such as the graphics frame buffer, graphics render to texture, etc.

Figure 5:
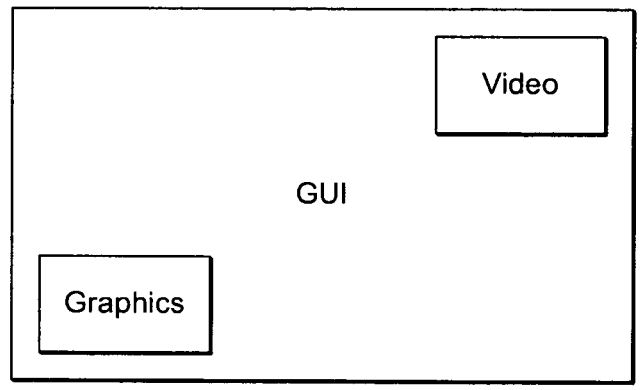
FIG. 5 shows the composition of several image sources to provide an output for display.

As will be appreciated by those skilled in the art, in a typical system that includes the graphics processor 1, there may be a number of image sources, such as the GUI, graphics and video. These sources may be composited using the display controller using layers, or a special purpose composition engine, or using the graphics processor, for example. FIG. 5 shows an example of such composited frame.

Figure 6:
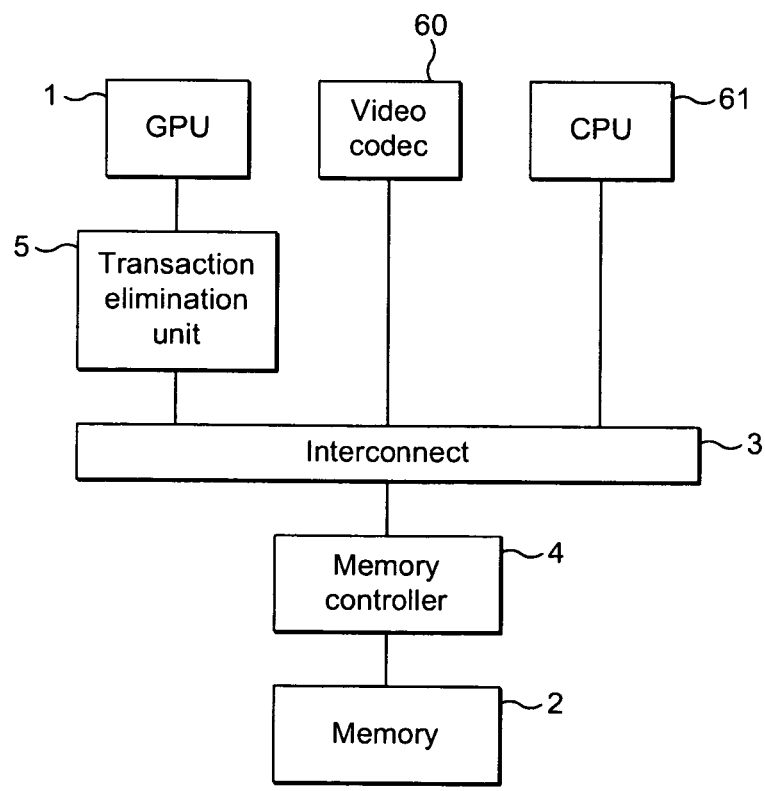
FIG. 6 shows schematically an embodiment of the technology described in this application where there are several image sources.

In such arrangements, the transaction elimination process of the technology described in this application could be used for example, in respect of the graphics processor only. FIG. 6 shows a possible system configuration for such an arrangement. In this case, there is a graphics processor 1, a video codec 60, and a CPU 61, each generating potential image sources for display. The transaction elimination unit 5 is arranged intermediate the graphics processor 1 and the memory interconnect 3.

However, the Applicants have recognised that the transaction elimination process of the technology described in this application could equally be used for other forms of data that is processed in blocks in a manner similar to the tiles of a tile-based graphics processor, such as a video processor (video codec) producing video blocks for a video frame buffer, and for graphics processor image composition. Thus the transaction elimination process of the technology described in this application may be applied equally to the image that is being, for example, generated by the video processor 60.

Figure 7:
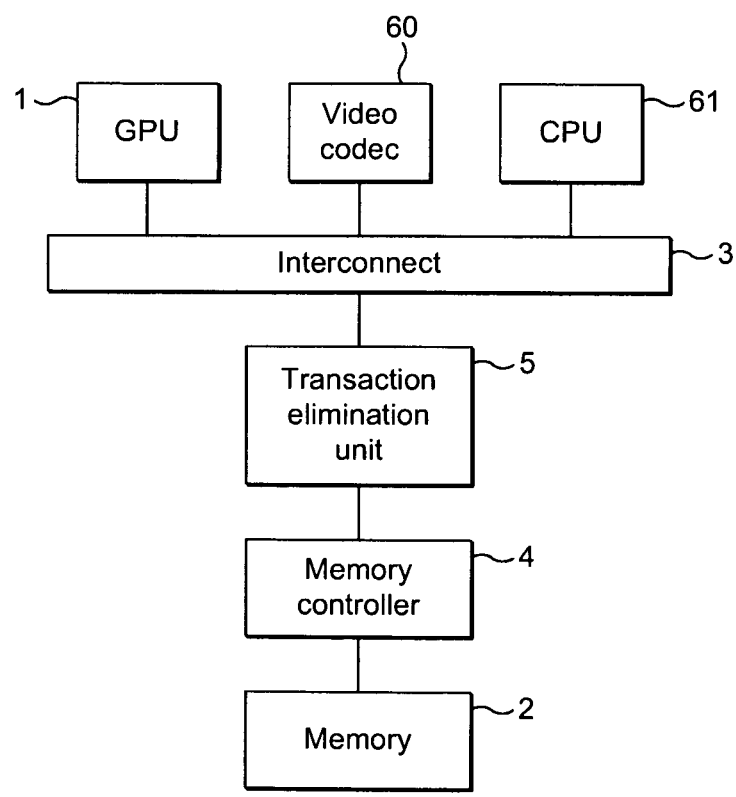
FIG. 7 shows schematically another embodiment of the technology described in this application where there are several image sources.

FIG. 7 therefore illustrates an alternative arrangement in which the transaction elimination hardware unit 5 is operable in the manner discussed above to handle appropriate image outputs from any of the graphics processor 1, video processor 60 and a CPU 61. In this arrangement, the transaction elimination hardware unit 5 is enabled to operate for certain master Ds and/or for certain defined and selected portions of the address map.

Other arrangements would, of course, be possible.

It would also be possible to use the technology described in this application where there are, for example, plural masters all writing data blocks to the output buffer. This may be the case, for example, when a host processor generates an "overlay" to be displayed on an image that is being generated by a graphics processor.

In such a case, all of the different master devices may, for example, have their outputs subjected to the data block comparison process. Alternatively, the data block comparison process may be disabled when there are two or more master devices generating data blocks for the output data array, either for the entire output data array, or only for those portions of the output data array where it is possible that two master devices may be generating output data blocks (only e.g., for the region of the output data array where the host processor's "overlay" is to appear).

Figure 8:
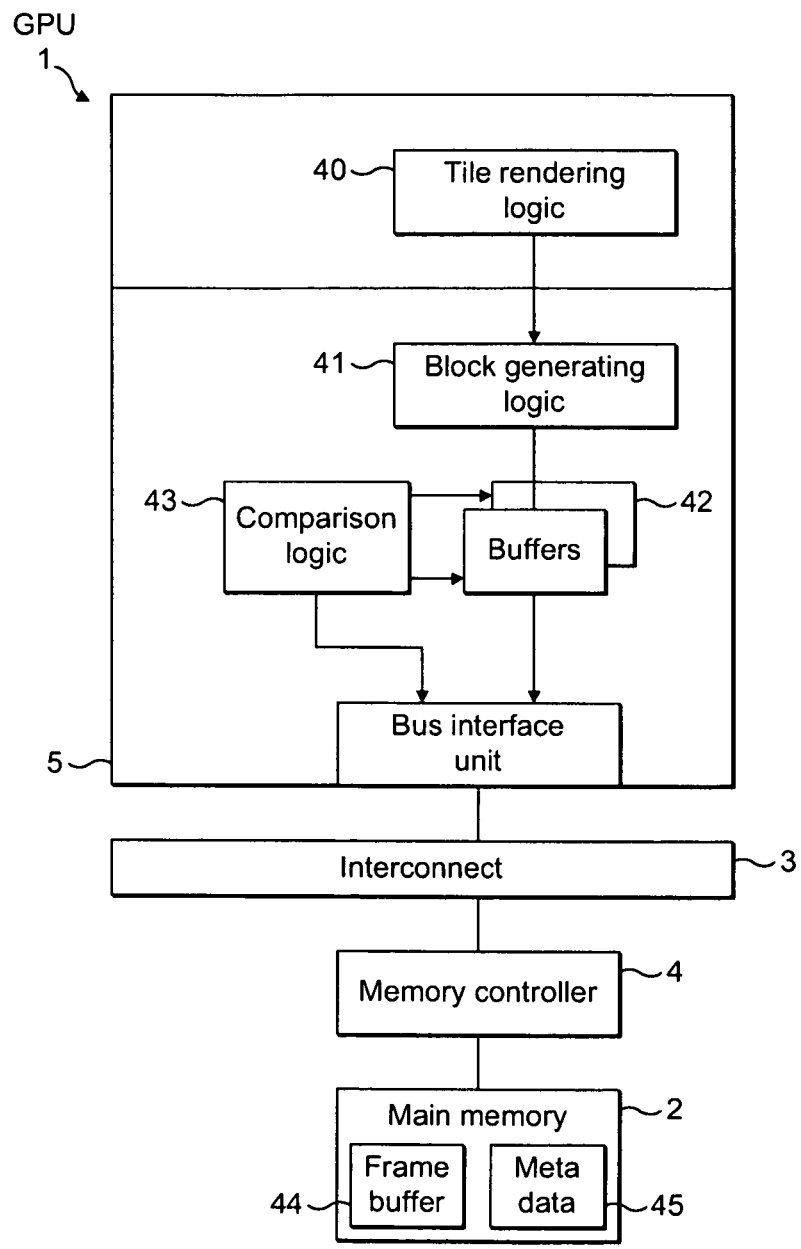
FIGS. 8 and 9 illustrate a further embodiment of the technology described in this application.
Figure 9:
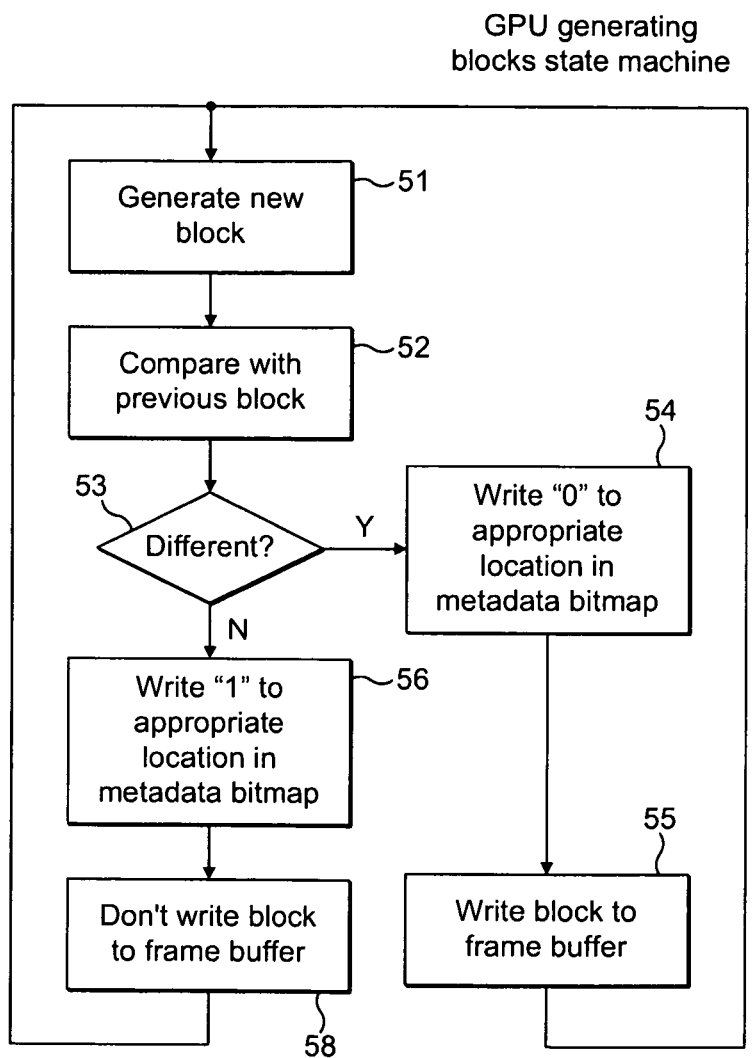

FIGS. 8 and 9 illustrate a further embodiment of the technology described in this application. FIG. 8 shows schematically the arrangement of the embodiment and FIG. 9 is a flow diagram showing the steps of the data block comparison process in the embodiment.

In this embodiment, as shown in FIG. 8, the transaction elimination hardware unit is an integral part of the graphic processor (GPU) 1. The transaction elimination hardware unit 5 also operates, as will be discussed further below, to compare new data blocks with other data blocks that have been generated for the output array (frame) in question, rather than with data blocks that have already been stored in the output data array.

Thus, in this embodiment, the graphics processor 1 includes after its tile rendering logic 40, a transaction elimination unit 5 that includes data block generation logic 41 and block comparison logic 43. The block generating logic 41 acts to generate the appropriate data blocks from the tiles that are generated by the tile rendering logic 40. In the present embodiment the block generating logic generates blocks that correspond to sub-tiles of the tiles that are generated by the tile rendering logic 40. However, as discussed herein, other sizes and forms of data block would be possible and could be generated by the block generating logic 41 if desired.

The block generating logic stores the successive blocks that it generates in buffers 42. Comparison logic 43 then compares respective data blocks that are stored in the buffers 42 (in this case a new data block with the immediately preceding data block), and generates an output metadata bit indicating whether the blocks can be considered to be the same or not, on the basis of the comparison. The meta-data output bits for plural blocks are collected and merged in a buffer (to increase memory efficiency), and then stored appropriately in a meta-data bitmap 45 in the main memory 2 that is associated with the output data array in question (written to off-chip memory). (Other arrangements would, of course, be possible.)

The data blocks are also read from the buffers 42 and, subject to the write elimination process discussed below, stored appropriately in the frame (output) buffer 4 in the memory 2.

In this embodiment the meta-data is arranged such that each data block (sub-tile) position in the output data array 44 in the memory 2 has associated with it a bit in the meta-data bitmap 45, with the bit in the bitmap for a data block being set to "1" if the data block was considered to be the same as the previous data block in the output data array, or set to "0" if the data block was considered to be different to the previous data block. This then allows, as will be discussed further below, any device that is reading the output data array 44 to determine which data block to use for each respective data block position.

To facilitate this operation, the data blocks making up the output frame are processed in a particular, predefined order (both for writing them to the frame buffer and reading them therefrom). An order that can exploit any spatial coherence between the blocks is preferably used.

The data array and meta-data generation process is shown as a flowchart in FIG. 9.

As shown in FIG. 9, the block generation logic 41 generates data blocks (in this case corresponding to sub-tiles) from the rendered tiles produced by the tile rendering logic 40 (step 51). The data blocks are then stored in the buffers 42.

The comparison logic 43 then compares a new data block with the previous data block (which will already be stored in the buffers 42) (step 52). In the present embodiment, the comparison logic 43 compares the content of the data blocks with each other. Other arrangements would be possible. For example, the comparison logic could compare signatures for the blocks rather than the actual content of the blocks, as discussed above.

The comparison logic then determines whether the new block should be considered to be similar to the previous block or not (step 53). In the present embodiment this assessment is based on how similar the contents of the two blocks being compared are. For example, a threshold of a particular amount of differences in the LSBs of the pixels is set, and if the difference between the content of the two blocks is less than this threshold, the blocks are determined to be similar, and vice-versa.

(This threshold can be varied (e.g. programmed) in use. It could, for example, be set per application, based on the proportion of static and dynamic frame data, and/or based on the power mode (e.g. low power mode or not) in use, etc.)

Other data block comparison schemes could be used if desired.

If the blocks are determined to be different (i.e. not to be similar) by the comparison logic in step 53, then the comparison logic operates to write the value "0" into the appropriate location in the meta-data bitmap 45 (step 54). The new data block is written from the buffers 42 to the frame buffer 44 in the main memory 2 (step 55).

On the other hand, if at step 53 it is determined that the blocks should be considered to be similar, then the comparison logic 43 operates to causes a "1" to be written into the appropriate location in the meta-data bitmap 45 (step 56).

Furthermore, in the case that the two blocks are considered to be similar to each other, the new block is not written into the data array in the frame buffer 44 (step 58).

The effect of this is that if a data block is determined to be the same as the previous data block (i.e. it is the same as a previous data block that will be stored in the frame buffer 44), then the new data block is not written into the frame buffer 44 as well. In this way write traffic for sections of the data array (frame buffer) 44 that are the same as each other can be avoided. (On the other hand, if the data blocks are determined to be different, then the new data block is written to the frame buffer 44).

In this arrangement, when a device, such as a display controller, comes to read the output data array 44 it will also read the corresponding meta-data bitmap 45. For each data block of the data array that it is due to process, it will read the corresponding bitmap entry, and if that bitmap entry is set to "1", will then know that that data block was considered to be the same as a previous data block that was stored in the output data array 44, and so will display the appropriate previous data block in the output data array 44 as the new block. Alternatively, if the meta-data associated with the data block to be processed is "0", the display controller will then know that it should read a new data block from the data array 44 and display that new block.

In this way, the appropriate data block data can be read and processed, even though the data array 44 may not contain a data block entry for each and every data block position in the data array 44.

(Thus, in these arrangements, although the data blocks themselves may not be written to the data array 44, the comparison meta-data 45 should still be generated and stored for the block position in question, as a processing device (such as a display controller) that is reading the data array will use that information to determine which other block should be processed instead.)

It will be appreciated here that if there is a sequence of similar blocks, then the meta-data will correspondingly comprise, in this embodiment, a sequence of "1"s, and any device reading the data array will then reuse the first block in the sequence for each successive similar block.

It would also be possible to compare a data block with plural other blocks of the data array (e.g. plural previous data blocks), to see if it is similar to any of those other blocks. In this case each meta-data entry may comprise plural bits, so as to be able to indicate which of the other data blocks, the block in question was considered to be similar to.

As discussed above, in a particularly preferred arrangement of this embodiment, where the data block comparisons may not be exact (may erroneously match blocks that do in fact differ), the system is configured to always write a newly generated data block to the frame buffer 44 periodically, e.g., once a second, in respect of each given data block (data block position).

A number of other alternatives and arrangements of the above embodiments and of the technology described in this application could be used if desired.

For example, it would be possible to provide hardware registers that enable/disable the tile signature calculations for particular frame regions, such that the transaction elimination signature generation and comparison is only performed for a tile if the register for the frame region in which the tile resides is set.

The driver for the graphics processor (for example) could then be configured to allow software applications to access and set these tile signature enable/disable registers, thereby giving the software application the opportunity to control directly whether or not and where (for which frame regions) the signature generation and comparisons take place. This would allow a software application to, for example, control how and whether the signature calculation and comparison is performed. This could then be used, e.g., to eliminate the power consumed by the signature calculation for a region of the output frame the application "knows" will be always updated (with the system then always updating such regions of the frame without performing any signature check first).

The number of such registers may chosen, for example, as a trade-off between the extra logic required implementing and using them and the desired granularity of control.

It would also be possible to further exploit the fact that, as discussed above, the number of tile matches in a frame can be used as a measure of the correlation between successive frames. For example, by using a counter to keep track of the number of tile matches in a given frame, it could be determined whether or not the image is static as between successive frames and/or for a period of time. If it is thereby determined that the image is static for a period of time, then, for example, the processor frame rate could be reduced (thereby saving power), the display refresh rate could be reduced, and/or the frame could be re-rendered using better anti-aliasing (thereby increasing the (perceived) image quality), and vice-versa.

The present arrangement also can be used in conjunction with other frame buffer power and bandwidth reduction techniques, such as frame-buffer compression. In this case, the write transaction elimination in the manner of the technology described in this application is preferably performed first, before the compression (or other) operation is carried out. Then, if the comparison process finds that the tiles' signatures are the same, the previous compressed tile can then be retained as the tile to use in the current output frame, but if the tile is not "eliminated", then the new tile will be sent to the frame-buffer compression (or other) hardware and then on to the frame buffer in memory. This then means that if the tiles' signatures match, the compression operation can be avoided.

Although the present embodiments have been described above, inter alia, with particular reference to the comparison of rendered tiles to be written to the frame buffer, as discussed herein, it is not necessary that the data blocks forming regions of the output data array that are compared (and e.g. have signatures generated for them) in the manner of the technology described in this application correspond exactly to rendered tiles generated by the graphics processor.

For example, the data blocks that are considered and compared in the manner of the technology described in this application could be made up of plural rendered tiles and/or could comprise sub-portions of a rendered tile. Indeed, different data block sizes may be used for different regions of the same output array (e.g. output frame) and/or the data block size and shape could be adaptively changed, e.g. depending upon the write transaction elimination rate, if desired.

Where a data block size that does not correspond exactly to the size of a rendered tile is being used, then the transaction elimination hardware unit 5 may conveniently be configured to, in effect, assemble or generate the appropriate data blocks (and, e.g., signatures for those data blocks) from the data, such as the rendered tiles, that it receives from the graphics processor (or other processor providing it data for an output array).

It can be seen from the above that the technology described in this application, in its preferred embodiments at least, can help to reduce, for example, graphics processor power consumption and memory bandwidth.

This is achieved, in the preferred embodiments of the technology described in this application at least, by eliminating unnecessary frame-buffer memory transactions. This reduces the amount of data that is rendered to the frame buffer, thereby significantly reducing system power consumption and the amount of memory bandwidth consumed. It can be applied to graphics frame buffer, graphics render to texture, video frame buffer and composition frame buffer transactions, etc.

The Applicants have found that for graphics and video operation, transaction reduction rates are likely to be between 0 and 30%. (Analysis of some common games, such as Quake 4 and Doom 3, has shown that between 0 and 30% of the tiles in each frame may typically be the same.) For composition frame buffer operation, transaction elimination rates are believed likely to be very high (greater than 90%), as most of the time only the mouse pointer moves.

The power savings when using the technology described in this application can be relatively significant.

For example, a 32-bit mobile DDR-SDRAM transfer may consume about 2.4 nJ per 32-bit transfer. Thus assuming a graphics processor frame output rate of 30 Hz, and considering first order effects only, graphics processor frame buffer writes will (absent the technology described in this application) consume about $(1920 \times 1080 \times 4) \times (2.4 \text{ nJ}/4) \times 30 = 150$ mW for HD graphics.

On the other hand, if one is able to eliminate 20% of the frame buffer traffic for HD graphics, that would save around 30 mW (and 50 MB/s). For HD composition frame buffer, removing 90% of the frame buffer traffic would save 135 mW (and 220 MB/s).

The invention claimed is:

1. A method of operating a data processing system in which data generated by the data processing system is used to form an output array of data in an output buffer, the method comprising:
    storing the output array of data in the output buffer by writing blocks of data representing particular regions of the output array of data to the output buffer; and
    when a block of data representing a first region of the output data array has been generated, comparing said block of data representing the first region of the output data array to at least one other block of data representing a different region of the same output data array by comparing signatures representative of the content of the respective data blocks, and determining whether or not to write said block of data representing the first region of the output data array to the output buffer on the basis of the comparison; and
    where it is determined to not write said block of data representing the first region of the output data array to the output buffer on the basis of the comparison, storing metadata that indicates which other data block of the same data array should be processed in place of the data block that was not written to the output buffer.

2. The method of claim 1, wherein the comparison process comprises comparing at least some of the content of the respective data blocks.

3. The method of claim 1, wherein said data block representing the first region of the output data array is compared with only one other data block.

4. The method of claim 1, wherein said data block representing the first region of the output data array is compared with another data block that has yet to be stored in the output buffer.

5. The method of claim 1, further comprising periodically always writing a newly generated data block to the output buffer in respect of each data block position.

6. The method of claim 1, wherein the data processing system is a tile-based graphics processing system and each data block corresponds to a rendered tile that the graphics processing system produces.

7. The method of claim 1, wherein the data processing system is a graphics processing system and the output data array is an output frame to be generated by the graphics processing system.

8. The method of claim 1, wherein the data processing system is a graphics processing system and the output buffer is the frame buffer to which the output of the graphics processing system is to be written.

9. The method of claim 1, wherein the data processing system is a graphics processing system and the output buffer is a texture or other surface to which the output of the graphics processing system is to be written.

10. The method of claim 1, wherein the metadata comprises at least one of:
a single bit that indicates that a previous data block of the same data array should be processed in place of the data block that was not written to the output buffer; and
plural bits indicating which data block of the same data array should be processed in place of the data block that was not written to the output buffer.

11. A data processing system, comprising:
a data processor configured to generate data to form an output array of data to be provided by the data processor; and
storing circuitry configured to store data generated by the data processor as an array of data in an output buffer by writing blocks of data representing particular regions of the array of data to the output buffer;
comparison circuitry configured to compare a block of data representing a first region of the output data array that has been generated to at least one other block of data representing a different region of the same output data array by comparing signatures representative of the content of the respective data blocks; and
determining circuitry configured to determine whether or not to write said block of data representing the first region of the output data array to the output buffer on the basis of that comparison;
and wherein the storing circuitry, where it is determined to not write said block of data representing the first region of the output data array to the output buffer on the basis of the comparison, is configured to store metadata that indicates which other data block of the same data array should be processed in place of the data block that was not written to the output buffer.

12. The system of claim 11, wherein the comparison circuitry is configured to compare at least some of the content of the respective data blocks.

13. The system of claim 11, wherein the comparison circuitry is configured to compare said data block representing the first region of the output data array with only one other data block.

14. The system of claim 11, wherein the comparison circuitry is configured to compare said data block representing the first region of the output data array with another data block that has yet to be stored in the output buffer.

15. The system of claim 11, wherein the storing circuitry is configured to always write a newly generated data block to the output buffer periodically in respect of each data block position.

16. The system of claim 11, wherein the data processing system is a tile-based graphics processing system and each data block corresponds to a rendered tile that the graphics processing system produces.

17. The system of claim 11, wherein the data processing system is a graphics processing system and the output buffer is the frame buffer to which the output of the graphics processing system is to be written.

18. The system of claim 11, wherein the data processing system is a graphics processing system and the output buffer is a texture or other surface to which the output of the graphics processing system is to be written.

19. The system of claim 11, comprising a write transaction elimination hardware circuitry which includes:
the storing circuitry configured to store data generated by the data processor as an array of data in an output buffer by writing blocks of data representing particular regions of the array of data to the output buffer;
the comparison circuitry configured to compare said block of data representing the first region of the output data array to said at least one other block of data representing a different region of the same output data array, and
the determination circuitry configured to determine whether or not to write said block of data representing the first region of the output data array to the output buffer on the basis of that comparison.

20. The system of claim 19, wherein the write transaction elimination hardware circuitry is an integral part of the data processor.

21. The system of claim 11, wherein the metadata comprises at least one of:
a single bit that indicates that a previous data block of the same data array should be processed in place of the data block that was not written to the output buffer; and
plural bits indicating which data block of the same data array should be processed in place of the data block that was not written to the output buffer.

22. A write transaction elimination apparatus for use in a data processing system in which an output array of data generated by the data processing system is stored in an output buffer by writing blocks of data representing particular regions of the output array of data to the output buffer, the apparatus comprising:
comparison circuitry configured to compare a block of data representing a first region of the output data array that has been generated with at least one other block of data representing a different region of the same output data array by comparing signatures representative of the content of the respective data blocks, and
determining circuitry configured to determine whether or not to write said block of data representing the first region of the output data array to the output buffer on the basis of the comparison; and
storing circuitry, wherein the storing circuitry, where it is determined to not write said block of data representing the first region of the output data array to the output buffer on the basis of the comparison, is configured to store metadata that indicates which other data block of the same data array should be processed in place of the data block that was not written to the output buffer.

23. The write transaction elimination apparatus of claim 22, wherein the metadata comprises at least one of:
a single bit that indicates that a previous data block of the same data array should be processed in place of the data block that was not written to the output buffer; and plural bits indicating which data block of the same data array should be processed in place of the data block that was not written to the output buffer.

24. One or more non-transitory computer readable storage devices having computer readable code embodied on the computer readable storage devices, the computer readable code for programming one or more data processors to perform a method of operating a data processing system in which data generated by the data processing system is used to form an output array of data in an output buffer, the method comprising:

storing the output array of data in the output buffer by writing blocks of data representing particular regions of the output array of data to the output buffer; and when a block of data representing a first region of the output data array has been generated, comparing said block of data representing the first region of the output array to at least one other block of data representing a different region of the same output data array by comparing signatures representative of the content of the respective data blocks, and determining whether or not to write said block of data representing the first region of the output data array to the output buffer on the basis of the comparison; and where it is determined to not write said block of data representing the first region of the output data array to the output buffer on the basis of the comparison, storing metadata that indicates which other data block of the same data array should be processed in place of the data block that was not written to the output buffer.

25. The one or more non-transitory computer readable storage devices of claim 24, wherein the metadata comprises at least one of:

a single bit that indicates that a previous data block of the same data array should be processed in place of the data block that was not written to the output buffer; and plural bits indicating which data block of the same data array should be processed in place of the data block that was not written to the output buffer.

* * * * *